US012639669B2

(12) United States Patent
Fadida et al.

(10) Patent No.: US 12,639,669 B2
(45) Date of Patent: May 26, 2026

(54) METHODS FOR GENERATING AN APPLICATION PROGRAMMING INTERFACE INVENTORY AND DEVICES THEREOF

(71) Applicant: F5, Inc., Seattle, WA (US)

(72) Inventors: Asaf Fadida, Tel Aviv (IL); Moshe Brumer, Tel Aviv (IL)

(73) Assignee: FS, Inc., Seattle, WA (US)

( * ) Notice: Subject to any disclaimer, the term of this patent is extended or adjusted under 35 U.S.C. 154(b) by 47 days.

(21) Appl. No.: 18/678,763

(22) Filed: May 30, 2024

(65) Prior Publication Data

US 2025/0356310 A1 Nov. 20, 2025

Related U.S. Application Data

(60) Provisional application No. 63/505,110, filed on May 31, 2023.

(51) Int. Cl.
G06Q 10/0875 (2023.01)
G06F 8/75 (2018.01)
G06F 9/54 (2006.01)

(52) U.S. Cl.
CPC ........... G06Q 10/0875 (2013.01); G06F 8/75 (2013.01); G06F 9/54 (2013.01)

(58) Field of Classification Search
CPC .......... G06Q 10/0875; G06F 8/75; G06F 9/54
See application file for complete search history.

(56) References Cited

U.S. PATENT DOCUMENTS

| | | | | |
|---|---|---|---|---|
| 1,147,373 | A | * 7/1915 | Clark | F16D 3/54 |
| | | | | 464/49 |
| 1,302,020 | A | * 4/1919 | Dittbrenner | F01L 7/024 |
| | | | | 123/59.1 |
| 8,126,722 | B2 | * 2/2012 | Robb | H04L 67/51 |
| | | | | 705/26.1 |

(Continued)

FOREIGN PATENT DOCUMENTS

| | | |
|---|---|---|
| WO | 2010043722 A1 | 4/2010 |
| WO | 2017016454 A1 | 2/2017 |

OTHER PUBLICATIONS

Office Action issued in corresponding EP Application No. 24178806. 6, mailed on Jul. 3, 2025, 16 pp.

(Continued)

*Primary Examiner* — Michael Jared Walker
(74) *Attorney, Agent, or Firm* — Troutman Pepper Locke LLP

(57) ABSTRACT
A method, system, non-transitory computer readable media, and communication system for generating an Application Programming Interface (API) inventory. The method comprises obtaining source code associated with a software application and analyzing the source code to identify one or more first API endpoints in the software application. The method further comprises obtaining API traffic between a server running the software application and a client device and analyzing the API traffic to identify one or more second API endpoints in the software application. Then the method comprises generating an API inventory by combining the identified one or more first API endpoints and the one or more second API endpoints into a single data structure.

20 Claims, 10 Drawing Sheets

(56)                References Cited

U.S. PATENT DOCUMENTS

| | | | | |
|---|---|---|---|---|
| 8,185,475 B2 * | 5/2012 | Hug | H04N 21/25816 | 705/902 |
| 8,370,407 B1 * | 2/2013 | Devarajan | H04L 63/1416 | 713/188 |
| 8,572,733 B1 * | 10/2013 | Rockwood | H04L 63/1433 | 709/224 |
| 8,743,699 B1 * | 6/2014 | Finlow-Bates | G01S 19/10 | 340/572.1 |
| 8,832,804 B1 * | 9/2014 | Casey | G06F 21/31 | 704/275 |
| 8,943,548 B2 * | 1/2015 | Drokov | H04W 12/06 | 380/255 |
| 8,943,588 B1 * | 1/2015 | Speegle | H04L 63/1416 | 726/22 |
| 9,055,093 B2 * | 6/2015 | Borders | H04L 63/1408 | |
| 9,077,709 B1 * | 7/2015 | Dall | H04L 63/0823 | |
| 9,221,340 B2 * | 12/2015 | Byers | B60K 28/16 | |
| 9,237,021 B2 * | 1/2016 | Mills | H04L 9/3268 | |
| 9,325,697 B2 * | 4/2016 | Datta | H04L 63/10 | |
| 9,338,007 B1 * | 5/2016 | Doshi | H04L 63/0815 | |
| 9,367,435 B2 * | 6/2016 | Sinyagin | G06F 11/3684 | |
| 9,390,178 B2 * | 7/2016 | Laredo | G06F 16/951 | |
| 9,397,990 B1 * | 7/2016 | Taly | H04L 63/08 | |
| 9,438,419 B1 * | 9/2016 | Aggarwal | H04L 9/0863 | |
| 9,444,916 B2 * | 9/2016 | Backholm | H04L 69/22 | |
| 9,578,055 B1 * | 2/2017 | Khanal | H04L 63/1491 | |
| 9,589,114 B2 * | 3/2017 | Strom | G06F 21/121 | |
| 9,628,499 B1 * | 4/2017 | Yu | H04L 63/1416 | |
| 9,654,485 B1 * | 5/2017 | Neumann | H04L 63/1416 | |
| 9,678,723 B2 * | 6/2017 | Itani | G06F 8/34 | |
| 9,705,895 B1 * | 7/2017 | Gutzmann | H04L 63/1408 | |
| 9,705,902 B1 * | 7/2017 | Call | H04L 43/04 | |
| 9,800,602 B2 * | 10/2017 | Shekyan | G06F 21/56 | |
| 9,900,344 B2 | 2/2018 | Smith | | |
| 9,967,250 B2 * | 5/2018 | Johansson | H04L 63/08 | |
| 10,353,754 B2 * | 7/2019 | Ghafourifar | G06F 40/40 | |
| 10,409,711 B2 * | 9/2019 | Dolby | G06F 11/3688 | |
| 10,534,629 B1 * | 1/2020 | St. Pierre | G06F 9/5055 | |
| 10,996,997 B2 * | 5/2021 | Dai | G06F 8/30 | |
| 11,108,803 B2 * | 8/2021 | Wilton | H04L 63/0281 | |
| 11,392,417 B2 | 7/2022 | Bolkhovitin | | |
| 11,663,110 B2 * | 5/2023 | Dolby | G06F 11/3604 | 717/126 |
| 12,105,617 B2 * | 10/2024 | Malipeddu | G06F 11/3688 | |
| 2002/0116615 A1 * | 8/2002 | Nguyen | G07F 17/32 | 713/168 |
| 2003/0004882 A1 * | 1/2003 | Holler | G06F 16/172 | 705/51 |
| 2003/0009538 A1 * | 1/2003 | Shah | H04L 67/568 | 709/219 |
| 2003/0042439 A1 * | 3/2003 | Rusu | G01R 31/31709 | 250/559.4 |
| 2003/0073091 A1 * | 4/2003 | Krylov | G01N 33/5308 | 435/6.16 |
| 2003/0145232 A1 * | 7/2003 | Poletto | H04L 63/1425 | 726/13 |
| 2003/0182447 A1 * | 9/2003 | Schilling | H04L 69/40 | 709/245 |
| 2003/0199762 A1 * | 10/2003 | Fritz | G06T 7/60 | 600/437 |
| 2004/0037326 A1 * | 2/2004 | D'Souza | H04L 63/1458 | 370/516 |
| 2004/0103283 A1 * | 5/2004 | Hornak | H04L 63/0823 | 726/13 |
| 2004/0170123 A1 * | 9/2004 | Carpenter | H04L 63/1458 | 370/395.41 |
| 2005/0027846 A1 * | 2/2005 | Wolfe | G06F 8/61 | 717/176 |
| 2005/0111367 A1 * | 5/2005 | Jonathan Chao | H04L 63/1408 | 370/235 |
| 2005/0195840 A1 * | 9/2005 | Krapp | H04L 63/166 | 370/401 |
| 2005/0198519 A1 * | 9/2005 | Tamura | H04L 63/1408 | 713/188 |
| 2005/0278547 A1 * | 12/2005 | Hyndman | G07C 9/20 | 713/185 |
| 2006/0031483 A1 * | 2/2006 | Lund | H04L 63/0236 | 709/224 |
| 2006/0031928 A1 * | 2/2006 | Conley | H04L 63/029 | 726/11 |
| 2006/0098675 A1 * | 5/2006 | Okuno | H04L 49/9094 | 370/412 |
| 2006/0208925 A1 * | 9/2006 | Wassingbo | G08B 13/2417 | 340/990 |
| 2006/0288411 A1 | 12/2006 | Garg | | |
| 2007/0118894 A1 | 5/2007 | Bhatia | | |
| 2007/0204065 A1 * | 8/2007 | Harton | H04L 65/1069 | 709/246 |
| 2007/0219917 A1 * | 9/2007 | Liu | G06Q 10/10 | 705/59 |
| 2007/0280114 A1 * | 12/2007 | Chao | H04L 47/21 | 370/252 |
| 2007/0294187 A1 * | 12/2007 | Scherrer | H04L 63/1425 | 705/75 |
| 2008/0010207 A1 * | 1/2008 | Yanagihara | H04L 63/10 | 705/51 |
| 2008/0028467 A1 * | 1/2008 | Kommareddy | H04L 63/1458 | 726/23 |
| 2008/0059797 A1 * | 3/2008 | Tokuno | H04L 63/0853 | 713/171 |
| 2008/0082662 A1 * | 4/2008 | Dandliker | H04L 63/10 | 709/225 |
| 2008/0196099 A1 * | 8/2008 | Shastri | H04L 41/0894 | 726/12 |
| 2008/0263215 A1 * | 10/2008 | Schnellbaecher | H04L 63/0884 | 709/229 |
| 2008/0320567 A1 * | 12/2008 | Shulman | H04L 63/1441 | 726/4 |
| 2009/0052330 A1 * | 2/2009 | Matsunaga | H04L 1/0019 | 370/242 |
| 2009/0167520 A1 * | 7/2009 | Watanabe | H04L 41/064 | 340/507 |
| 2009/0172162 A1 * | 7/2009 | Wood | H04L 51/212 | 709/226 |
| 2009/0199297 A1 * | 8/2009 | Jarrett | G06F 21/566 | 726/24 |
| 2009/0241173 A1 * | 9/2009 | Troyansky | G06F 21/6218 | 726/5 |
| 2009/0241174 A1 * | 9/2009 | Rajan | G06F 21/31 | 715/863 |
| 2009/0265784 A1 * | 10/2009 | Waizumi | H04L 63/1425 | 703/2 |
| 2010/0017627 A1 * | 1/2010 | Princen | G06F 21/602 | 713/193 |
| 2010/0031315 A1 * | 2/2010 | Feng | H04L 63/1458 | 709/229 |
| 2010/0070451 A1 * | 3/2010 | Hugues | H04L 63/1458 | 719/331 |
| 2010/0070620 A1 * | 3/2010 | Awadallah | H04L 63/1425 | 709/224 |
| 2010/0088752 A1 * | 4/2010 | Nagulakonda | H04L 63/123 | 726/6 |
| 2010/0284282 A1 * | 11/2010 | Golic | H04L 43/022 | 370/242 |
| 2010/0295943 A1 * | 11/2010 | Cha | G01S 13/82 | 340/539.13 |
| 2010/0312875 A1 * | 12/2010 | Wilerson | H04L 61/4511 | 709/224 |
| 2010/0325418 A1 * | 12/2010 | Kanekar | H04L 63/0823 | 713/151 |
| 2011/0012586 A1 * | 1/2011 | Montanari | G01R 31/1272 | 324/76.77 |
| 2011/0072516 A1 * | 3/2011 | Cohen | H04L 63/1408 | 726/22 |
| 2011/0083181 A1 * | 4/2011 | Nazarov | H04L 63/14 | 726/23 |
| 2011/0138463 A1 * | 6/2011 | Kim | H04L 63/1458 | 726/22 |

(56) References Cited

U.S. PATENT DOCUMENTS

| | | | | |
|---|---|---|---|---|
| 2011/0154026 A1* | 6/2011 | Edstrom | H04L 63/166 | 713/158 |
| 2011/0197177 A1* | 8/2011 | Mony | G06F 8/51 | 717/115 |
| 2011/0199185 A1* | 8/2011 | Karaoguz | H04L 67/52 | 340/8.1 |
| 2011/0264621 A1* | 10/2011 | Burjoski | H04L 61/4552 | 707/610 |
| 2011/0264905 A1* | 10/2011 | Ovsiannikov | H04L 63/166 | 713/151 |
| 2011/0280160 A1* | 11/2011 | Yang | H04L 65/1079 | 370/259 |
| 2012/0017090 A1* | 1/2012 | Gould | H04L 63/08 | 713/176 |
| 2012/0023090 A1* | 1/2012 | Holloway | H04L 67/568 | 707/E17.108 |
| 2012/0079592 A1* | 3/2012 | Pandrangi | H04L 47/10 | 709/224 |
| 2012/0090030 A1* | 4/2012 | Rapaport | H04L 63/1441 | 726/23 |
| 2012/0110646 A1* | 5/2012 | Ajitomi | G06F 21/335 | 726/4 |
| 2012/0117621 A1* | 5/2012 | Kondamuru | H04L 63/168 | 726/3 |
| 2012/0144487 A1* | 6/2012 | Kim | H04L 63/1416 | 726/23 |
| 2012/0167210 A1* | 6/2012 | Oro Garcia | H04L 63/101 | 726/22 |
| 2012/0173710 A1* | 7/2012 | Rodriguez | H04L 63/1425 | 709/224 |
| 2012/0203904 A1* | 8/2012 | Niemela | H04L 61/4511 | 709/225 |
| 2012/0233665 A1* | 9/2012 | Ranganathan | G06F 21/51 | 726/4 |
| 2012/0254386 A1* | 10/2012 | Smith | H04L 61/4511 | 709/223 |
| 2012/0323700 A1* | 12/2012 | Aleksandrovich | G06F 21/36 | 705/14.69 |
| 2013/0080407 A1* | 3/2013 | Levow | G06F 16/2308 | 707/741 |
| 2013/0081129 A1* | 3/2013 | Niemela | H04L 63/0236 | 726/22 |
| 2013/0174277 A1* | 7/2013 | Kiukkonen | H04L 63/104 | 726/28 |
| 2013/0276114 A1* | 10/2013 | Friedrichs | G06F 21/56 | 726/23 |
| 2014/0040993 A1* | 2/2014 | Lorenzo | G06F 21/6236 | 726/4 |
| 2014/0090071 A1* | 3/2014 | Salehie | G06F 21/55 | 726/25 |
| 2014/0095865 A1* | 4/2014 | Yerra | H04L 9/3271 | 713/156 |
| 2014/0157405 A1* | 6/2014 | Joll | H04L 63/1425 | 726/22 |
| 2014/0181922 A1* | 6/2014 | Jakobsson | H04L 63/083 | 726/5 |
| 2014/0230051 A1* | 8/2014 | Vallinayagam | H04L 63/1416 | 726/22 |
| 2014/0289854 A1* | 9/2014 | Mahvi | H04L 63/1416 | 726/23 |
| 2014/0298419 A1* | 10/2014 | Boubez | H04L 63/08 | 726/4 |
| 2014/0317739 A1* | 10/2014 | Be'ery | H04L 63/14 | 726/23 |
| 2014/0337954 A1* | 11/2014 | Ahmed | H04L 63/0815 | 726/8 |
| 2014/0373088 A1* | 12/2014 | Aggarwal | G06F 21/46 | 726/1 |
| 2015/0026766 A1* | 1/2015 | Holloway | H04L 63/0281 | 726/1 |
| 2015/0067328 A1* | 3/2015 | Yin | H04L 63/0807 | 713/168 |
| 2015/0088662 A1* | 3/2015 | Noller | G06N 20/00 | 705/14.66 |
| 2015/0128236 A1* | 5/2015 | Moscicki | G06F 21/31 | 726/7 |
| 2015/0163234 A1* | 6/2015 | Tal | G06F 21/552 | 726/1 |
| 2015/0215334 A1* | 7/2015 | Bingham | H04L 63/1425 | 726/23 |
| 2015/0271179 A1* | 9/2015 | Wang | H04L 63/0846 | 726/30 |
| 2015/0295945 A1* | 10/2015 | Canzanese, Jr. | G06F 21/55 | 726/23 |
| 2015/0310196 A1* | 10/2015 | Turgeman | H04W 12/06 | 726/19 |
| 2015/0341379 A1* | 11/2015 | Lefebvre | H04L 43/04 | 726/22 |
| 2015/0350186 A1* | 12/2015 | Chan | H04L 63/0815 | 726/9 |
| 2016/0014119 A1* | 1/2016 | Inoue | H04L 63/0853 | 726/9 |
| 2016/0021117 A1* | 1/2016 | Harmon | H04L 63/20 | 726/1 |
| 2016/0057140 A1* | 2/2016 | Heeter | H04W 12/08 | 726/4 |
| 2016/0065579 A1* | 3/2016 | Chen | H04L 63/0884 | 726/4 |
| 2016/0080345 A1* | 3/2016 | Safruti | H04L 67/02 | 726/6 |
| 2016/0080412 A1* | 3/2016 | Smith | H04L 63/1458 | 726/1 |
| 2016/0127406 A1* | 5/2016 | Smith | H04L 63/1458 | 726/23 |
| 2016/0328715 A1* | 11/2016 | Gideoni | G06Q 20/401 | |
| 2016/0352774 A1* | 12/2016 | Akcin | H04L 63/0236 | |
| 2016/0359658 A1* | 12/2016 | Yadav | H04L 43/045 | |
| 2016/0381022 A1* | 12/2016 | Jackson | H04L 63/1441 | 726/7 |
| 2017/0006033 A1* | 1/2017 | Stecher | H04W 12/37 | |
| 2017/0012838 A1 | 1/2017 | Kashtan et al. | | |
| 2017/0063923 A1* | 3/2017 | Yang | G06F 21/56 | |
| 2017/0171231 A1* | 6/2017 | Reybok, Jr. | H04L 63/1433 | |
| 2017/0208483 A1* | 7/2017 | Chmiel | H04L 5/001 | |
| 2017/0249306 A1* | 8/2017 | Allen | G06F 16/24578 | |
| 2017/0318053 A1* | 11/2017 | Singh | H04L 63/1425 | |
| 2018/0060107 A1* | 3/2018 | Hu | G06F 9/45558 | |
| 2018/0124110 A1* | 5/2018 | Hunt | G06F 16/24578 | |
| 2018/0124300 A1* | 5/2018 | Brook | H04N 23/62 | |
| 2018/0152356 A1* | 5/2018 | Dhariwal | H04L 41/40 | |
| 2018/0267847 A1* | 9/2018 | Smith | H04L 67/141 | |
| 2018/0314613 A1* | 11/2018 | Nahum | G11C 29/56016 | |
| 2019/0034199 A1 | 1/2019 | Pollock | | |
| 2019/0238554 A1* | 8/2019 | Disraeli | G06F 21/31 | |
| 2019/0370049 A1* | 12/2019 | Gopalan | G06F 9/45558 | |
| 2019/0384642 A1* | 12/2019 | Bolkhovitin | G06F 3/067 | |
| 2020/0065160 A1* | 2/2020 | Park | G06F 8/42 | |
| 2020/0142674 A1* | 5/2020 | Hernan | G06F 9/541 | |
| 2021/0019159 A1* | 1/2021 | Lu | G06F 9/5027 | |
| 2021/0117249 A1* | 4/2021 | Doshi | H04L 67/51 | |
| 2021/0263779 A1* | 8/2021 | Haghighat | G06F 11/3495 | |
| 2022/0103613 A9* | 3/2022 | Palladino | H04L 67/1004 | |
| 2022/0197773 A1* | 6/2022 | Butler | G06F 9/505 | |
| 2023/0093659 A1* | 3/2023 | O'Dell | G06F 9/54 | 719/328 |
| 2023/0145437 A1* | 5/2023 | Costa | G06F 9/4887 | 718/107 |

OTHER PUBLICATIONS

European Search Report for European U.S. Appl. No. 24/178,806, dated Sep. 30, 2024.

Choi et al., "Lamba NIC: interactive Serverless Compute on Programmable SmartNICs", 2020 IEEE 4oth International Conference on Distributed Computing Systems, Nov. 29, 2020, IEEE Publishing.

Kwon et al., "Design and Prototyping of Container-Enabled Cluster for High Performance Data Analytics", 2019 International Conference on Information Networking, Jan. 9, 2019, IEEE Publishing.

(56) References Cited

OTHER PUBLICATIONS

Han et al., "Refining Microservices Placement Employing Workload Profiling OVer Multiple Kubernetes Clusters", IEEE Acess, Oct. 22, 2020, IEEE Publishing.

Yen et al., "Meeting SLOs in cross-platform NFV", Proceedings of the 16th International Conference on emerging Networking Experiments Technlogies, Nov. 2020.

Cong et al., "Customizable computing-From Single Chip to Datacenters", Proceedings of the IEEE (vol. 107, Issue: 1, Jan. 2019), IEEE Publishing.

EP Application No. 21211849.1, Office Action dated May 10, 2023.

Kayal Paridhika .: "Kubernetes in Fog Computing: Feasibility Demonstration, Limitations and Improvement Scope: Invited Paper", 2020 IEEE 6th World Forum on Internet of Things (WF-IOT), IEEE, Jun. 2, 2020 (May 2, 2020), pp. 1-6, XP033840977, DOI: 10.1.109/WF-IOT48-1302020.9221340.

BIG-IP Application Security Manager Operations Guide, Publication No. BIG-IP ASMOps 01_ 1, F5 Networks, Inc., pp. 1-181, Jul. 2016.

BIG-IP ASM Operations Guide, Version 14.0, F5 Networks, Inc., pp. 1-102, Dec. 2018.

BIG-IP ASM, Version 11.5.0, Release Notes, F5 Networks, Inc., pp. 1-44, Apr. 12, 2016.

BIG-IP ASM, Version 11.6.1, Release Notes, F5 Networks, Inc., pp. 1-18, Jun. 13, 2016.

Big-IP® Access Policy Manager Implementations, Version 13.0, F5 Networks, Inc. (2017).

BIG-IP® Analytics: Implementations, Version 11.3, Publication No. MAN-0357-03, F5 Networks, Inc., pp. 1-Nov. 1, 405, 2012.

BIG-IP® Analytics: Implementations, Version 11.5, Publication No. MAN-0357-05, F5 Networks, Inc., pp. 1-50, Aug. 25, 2015.

BIG-IP® Analytics: Implementations, Version 11.6, Publication No. MAN-0357-06, F5 Networks, Inc. pp 1-62, Aug. 24, 2015.

BIG-IP® Applicatin Security Manager Tm: Attack and Bot Signatures, Version 12.1, Publication No. MAN-0578-01, F5 Networks, Inc., pp. 1-50, Nov. 4, 2016.

BIG-IP® Application Security Manager TM: Gelling Started, Version 11.6, Publication No. MAN-0285-09, F5 Networks, Inc., pp. 1-78, Aug. 20, 2014.

BIG-IP® Application Security Manager Tm: Gelling Started, Version 12.1, Publication No. MAN-0285-11, F5 Networks, Inc., pp. 1-70, Jul. 11, 2017.

BIG-IP® Application Security Manager TM: Implementations, Version 11.5, Publication No. MAN-0358-06, F5 Networks, Inc., pp. 1-396, Jan. 27, 2014.

BIG-IP® Application Security Manager TM: Implementations, Version 11.6, Publication No. MAN-0358-07, F5 Networks, Inc., pp. 1-420, Aug. 20, 2014.

BIG-IP® Application Security Manager Tm: Implementations, Version 12.1, Publicaiton No. MAN-0358-09, F5 Networks, Inc., pp. 1-388, Sep. 29, 2017.

BIG-IP® Application Security Manager Tm: Implementations, Version 13.0, Publication No. MAN-0358-10, F5 Networks, Inc., pp. 1-348. Nov. 10, 2017.

BIG-IP® CGNAT: Implementations, MAN-0285-05, Version 12.1, F5 Networks, Inc., Mar. 7, 2018, pp. 1-178.

BIG-IP@ CGNAT: Implementations, MAN-0428-06, Version 13.0, F5 Networks, Inc., Aug. 29, 2018, pp. 1-206.

BIG-IP® DNS Services: Implementations, Version 11.3, Publication No. MAN-0446-00, F5 Networks, Inc., pp. 1-76, Feb. 5, 2016.

BIG-IP® DNS Services: Implementations, Version 11.5, Publication No. MAN-0446-02, F5 Networks, Inc., pp. 1-156, Jan. 27, 2014.

BIG-IP® Global Traffic Manger": Implementations," Version 11.4, Publication No. MAN-0388-03, F5 Networks, nc., pp. 1-106, Feb. 21, 2014.

BIG-IP® Local Traffic Management: Basics, Version 11.6, Publication No. MAN-0538-00, F5 Networks, Inc., pp. 1-74, Mar. 17, 2016.

BIG-IP® Local Traffic ManagerTm: Concepts, Version 11.4., Publication No. MAN-0377-05, F5 Networks, Inc, pp. 1-178, Sep. 26, 2013.

BIG-IP® Local Traffic Manager Tm: Implementations, Version 11.4, Publication No. MAN-0293-08, F5 Networks, nc., Nov. 19, 2014; 209 pages.

BIG-IP® Local Traffic ManagerTm: Monitors Reference, Version 11.4, Publication No. MAN 0470-00, F5 Networks, Inc., pp. 1-106, Nov. 26, 2013.

BIG-IP® Network Firewall: Policies and Implementations, Version 11.6, Publication No. MAN-0439-04, F5 Networks, Inc., pp. 1-166, Aug. 20, 2014.

BIG-IP® System and SafeNet® Luna SA HSM: Implementations, Version 11.6, Publication No. MAN-0496-01, F5 Networks, Inc., pp. 1-26, Oct. 21, 2016.

BIG-IP® Systems: DoS Protection and Protocol Firewall Implementations, Version 11.6, Publication No. MAN-0440-03, F5 Networks, Inc., pp. 1-108, Aug. 20, 2014.

BIG-IP® TMOS®: Concepts, Version 11.5, Publication No. MAN-0378-04, F5 Networks, Inc., pp. 1-148, May 1, 1014.

BIG-IP® Tmos®: Implementations, Version 11.5, Publication No. MAN-0379-05, F5 Networks, Inc., pp. 1-274, Sep. 2, 2014.

BIG-IP® TMOS®: Implementations, Version 12.0, Publication No. MAN-0379-09, F5 Networks, Inc., December J1, 2015; paged 1-264.

D. Hardi, Ed., RFC 6749 "The OAuth 2.0 Authorization Framework", Oct. 2012, Internet Engineering Task Force IETF), pp. 1-76.

E. Hammer-Lahav, Ed. , RFC 5849 "The OAuth 1.0 Protocol", Apr. 2010, Internet Engineering Task Force (IETF), Jages 1-38.

F5 TMOS Operations Guide, Version 12.1, F5 Networks, Inc., Publication No. BIG-IP TMOSOps-02_1, pp. 1-276, Jul. 2016.

Jones et al., RFC 6750 "The OAuth 2.0 Authorization Framework: Bearer Token Usage", Oct. 2012, Internet Engineering Task Force (IETF), pp. 1-18.

Operations Guide 1.0 F5 Local Traffic Manager and Global Traffic Manager, Publication No. BIG-IP TMGTMOps-01_0_0, F5 Networks, pp. 1-144, Dec. 12, 2014.

Release Note: BIG-IP LTM and TMOS, Version 11.4.1, F5 Networks, Inc., pp. 1-58, Dec. 18, 2014.

Rossow et al., "Sandnet: Network Traffic Analysis of Malicious Software," Proceedings of the First Workshop on Building Analysis Datasets and Gathering Experience Returns for Security, pp. 78-88, Apr. 10, 2011.

Tegeler et al., "Bo!Finder: Finding Bots in Network Traffic Without Deep Packet Inspection," CoNEXT '12: Conference Jn Emerging Networking Experiments and Technologies, pp. 349-360. Dec. 10, 2012.

UK Search Report for Application No. GB1705857.9, Date of Search Oct. 11, 2017, 1 page.

Nang et al., "Engaging Edge Networks in Preventing and Mitigating Undesirable Network Traffic," 2007 3rd IEEE Norkshop on Secure Network Protocols, 6 pp, Oct. 16, 2007.

What is Passwordless?, Azure Active Directory Passwordless Sign In (Preview)—Microsoft Docs, pp. 1-5, August 4, 1019.

Ihang et al., "Boosting the Scalability of Baine! Detection Using Adaptive Traffic Sampling," In Proceedings of the 6th ACM Symposium on Information, Computer and Communications Security, pp. 124-134, Mar. 22, 2011.

* cited by examiner

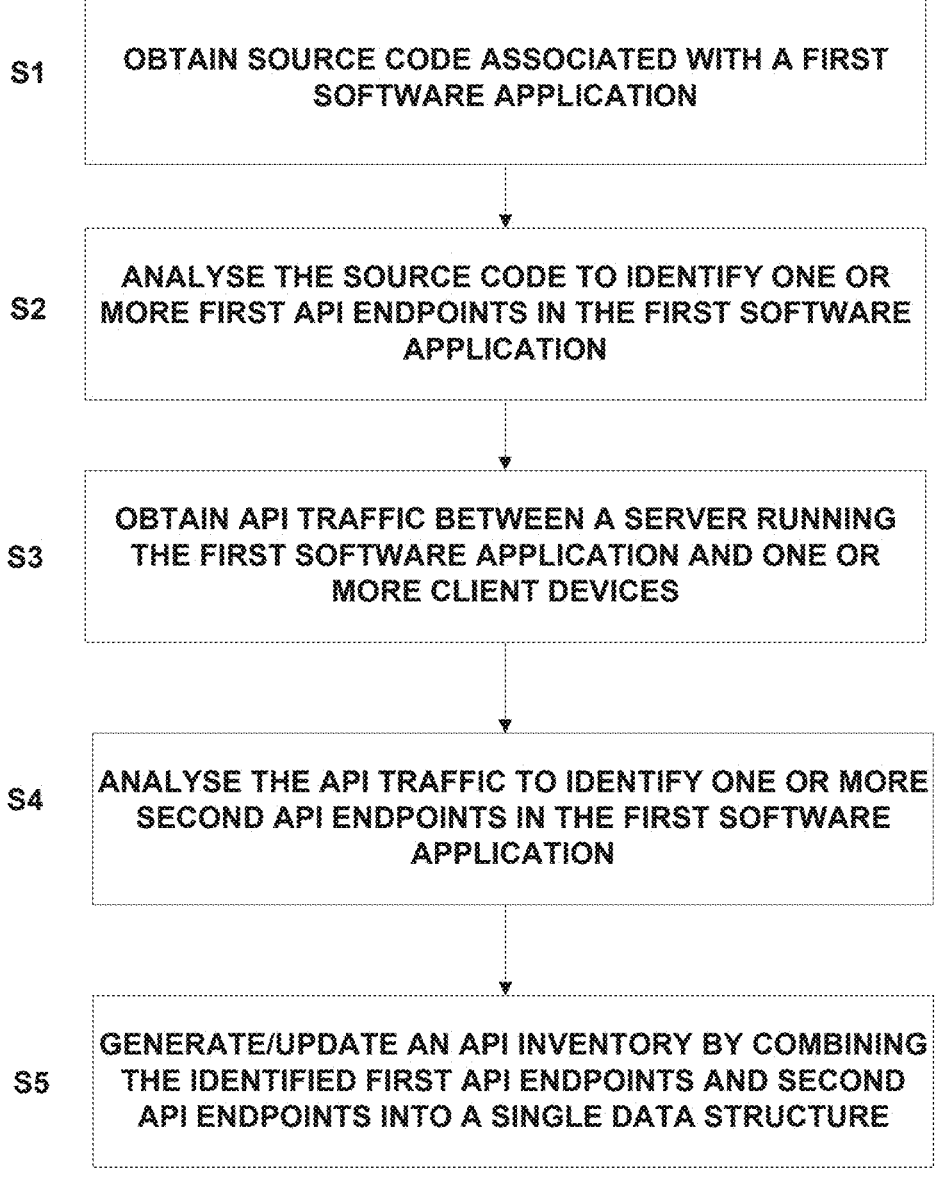

S1 — OBTAIN SOURCE CODE ASSOCIATED WITH A FIRST SOFTWARE APPLICATION

S2 — ANALYSE THE SOURCE CODE TO IDENTIFY ONE OR MORE FIRST API ENDPOINTS IN THE FIRST SOFTWARE APPLICATION

S3 — OBTAIN API TRAFFIC BETWEEN A SERVER RUNNING THE FIRST SOFTWARE APPLICATION AND ONE OR MORE CLIENT DEVICES

S4 — ANALYSE THE API TRAFFIC TO IDENTIFY ONE OR MORE SECOND API ENDPOINTS IN THE FIRST SOFTWARE APPLICATION

S5 — GENERATE/UPDATE AN API INVENTORY BY COMBINING THE IDENTIFIED FIRST API ENDPOINTS AND SECOND API ENDPOINTS INTO A SINGLE DATA STRUCTURE

FIG. 2

S21     PERFORM STEPS S1 TO S5

S22     SELECT AN ENDPOINT

S23     DETERMINE A GENERIC FORM FOR THE ENDPOINT

S24     SEARCH FOR ENDPOINTS THAT MATCH THE GENERIC FORM

S25     MERGE THE MATCHING ENDPOINTS IN THE HIERARCHICAL DATA STRUCTURE

GET api/v1/users/{username}
GET api/v1/users/bob
GET api/v1/users/john

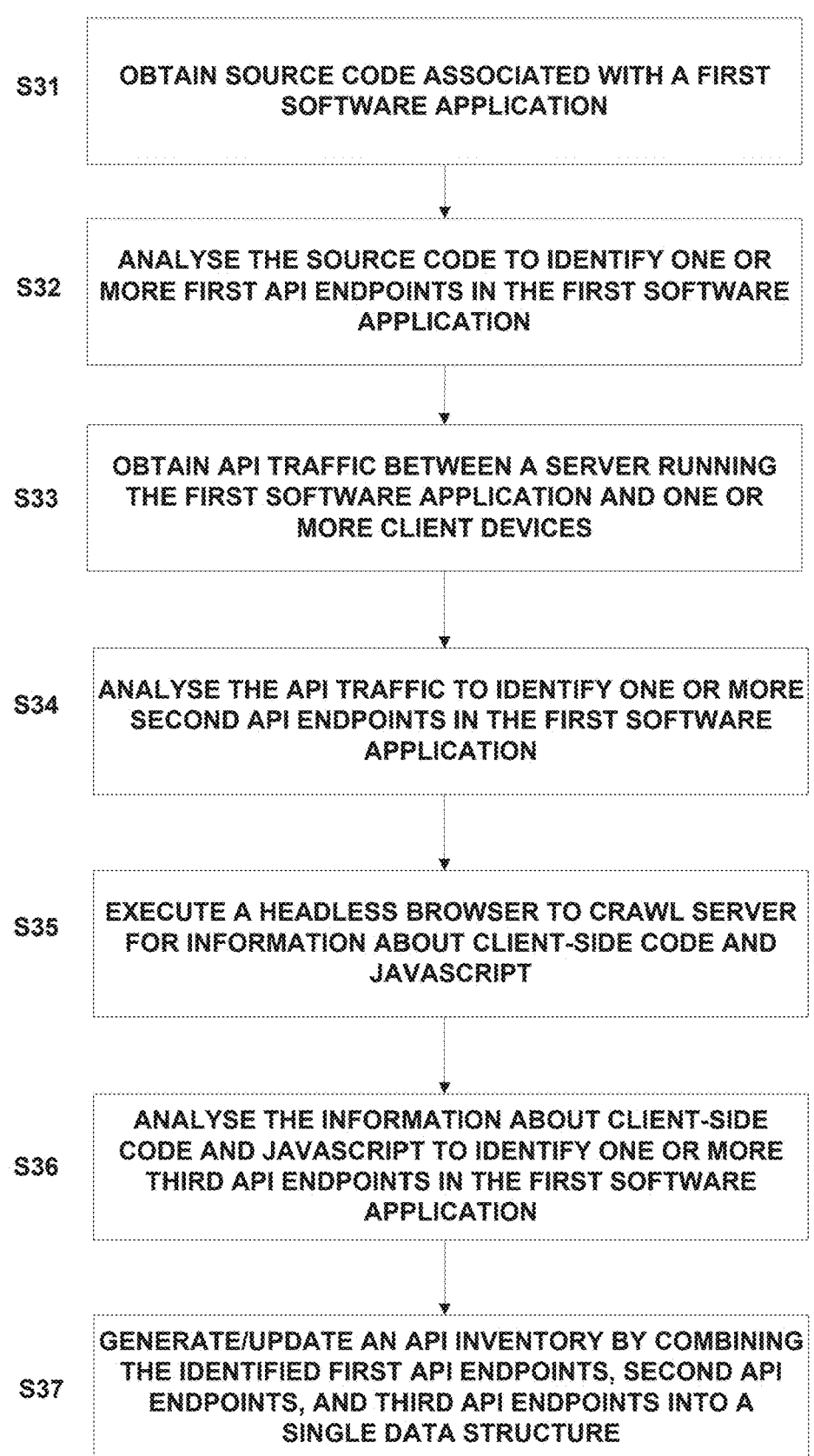

S31    OBTAIN SOURCE CODE ASSOCIATED WITH A FIRST SOFTWARE APPLICATION

S32    ANALYSE THE SOURCE CODE TO IDENTIFY ONE OR MORE FIRST API ENDPOINTS IN THE FIRST SOFTWARE APPLICATION

S33    OBTAIN API TRAFFIC BETWEEN A SERVER RUNNING THE FIRST SOFTWARE APPLICATION AND ONE OR MORE CLIENT DEVICES

S34    ANALYSE THE API TRAFFIC TO IDENTIFY ONE OR MORE SECOND API ENDPOINTS IN THE FIRST SOFTWARE APPLICATION

S35    EXECUTE A HEADLESS BROWSER TO CRAWL SERVER FOR INFORMATION ABOUT CLIENT-SIDE CODE AND JAVASCRIPT

S36    ANALYSE THE INFORMATION ABOUT CLIENT-SIDE CODE AND JAVASCRIPT TO IDENTIFY ONE OR MORE THIRD API ENDPOINTS IN THE FIRST SOFTWARE APPLICATION

S37    GENERATE/UPDATE AN API INVENTORY BY COMBINING THE IDENTIFIED FIRST API ENDPOINTS, SECOND API ENDPOINTS, AND THIRD API ENDPOINTS INTO A SINGLE DATA STRUCTURE

FIG. 9

METHODS FOR GENERATING AN APPLICATION PROGRAMMING INTERFACE INVENTORY AND DEVICES THEREOF

This application claims priority to U.S. Provisional Patent Application No. 63/505,110, filed on May 31, 2023, which is hereby incorporated herein by reference in its entirety.

FIELD

The present application relates to Application Programming Interface (API), and more particularly to generating an API endpoint inventory.

BACKGROUND

An API is a set of rules and protocols that allows different software applications to communicate with each other by defining the way requests and responses should be formatted. APIs are integral to modern software development, enabling communication between different software components and services. Ensuring the security of APIs is crucial, as unauthorized access or misuse can lead to severe consequences, including data breaches and service disruptions. One key aspect of API security is maintaining an accurate and up-to-date inventory of all APIs in a system, and particularly API endpoints. An API endpoint is a specific point within an API where a client can send a request and receive a response, typically represented by a unique combination of an HTTP method (e.g., GET, POST, PUT, DELETE) and a uniform resource locator (URL) path.

Existing methods for API inventory management (e.g., for finding API endpoints) are typically labor-intensive, time-consuming, and prone to human error, leading to incomplete or outdated API inventories. Furthermore, they may not adequately capture the dynamic nature of APIs in real-time or provide a comprehensive view of the API landscape.

SUMMARY

This disclosure is directed to methods and devices related to generating an API endpoint inventory that overcome or at least alleviate problems discussed above. Relevant non-transitory computer readable medium and network communication system are also disclosed.

According to an aspect, there is provided a method for generating an API inventory. The method comprises obtaining source code associated with a software application. The method further comprises analyzing the source code to identify one or more first API endpoints in the software application. Then the method further comprises obtaining API traffic between a server running the software application and a client device, and analyzing the API traffic to identify one or more second API endpoints in the software application. Then the method comprises generating an API inventory by combining the one or more first API endpoints and one or more second API endpoints into a single data structure.

In some embodiments, the method further comprises executing a headless browser to crawl the server for information associated with client-side code and JavaScript and analyzing the information associated with client-side code and JavaScript to identify one or more third API endpoints in the software application. The generating the API inventory comprises combining the one or more first API endpoints, the one or more second API endpoints, and the one or more third API endpoints into the single data structure.

In some embodiments, the API traffic comprises at least one of a request or a response between the one or more client devices and the server running the software application.

In some embodiments, the API traffic is live traffic.

In some embodiments, the method further comprises monitoring data output by the API endpoints included in the API inventory to identify deviation data from the output data, and flagging the deviation data or stopping a transmission of the deviation data, wherein the deviation data deviates from a reference data by a predetermined threshold.

In some embodiments, the single data structure is a hierarchical data structure.

In some embodiments, combining the identified API endpoints into the single data structure comprises comparing the identified API endpoints to identify matching API endpoints; and merging the matching API endpoints in the hierarchical data structure.

In some embodiments, comparing the identified API endpoints to identify matching API endpoints comprises using at least one of a 'find_match' function or a 'compare_tree' function.

In some embodiments, merging the matching API endpoints in the hierarchical data structure comprises using a 'reduce_matches' function to reduce the number of matches for a given API endpoint by comparing request entities of the identified matches and updating the hierarchical data structure accordingly.

According to another aspect, there is provided a system comprising memory comprising programmed instructions stored in the memory and a processor configured to be capable of executing the programmed instructions stored in the memory to obtain source code associated with a software application and analyze the source code to identify one or more first API endpoints in the software application. The processor is further configured to obtain API traffic between a server running the software application and a client device, and analyze the API traffic to identify one or more second API endpoints in the software application. The processor is further configured to generate an API inventory by combining the identified one or more first API endpoints and one or more second API endpoints into a single data structure.

According to another aspect, there is provided a non-transitory computer-readable medium having stored thereon instructions executable by a processor to obtain source code associated with a software application, and analyze the source code to identify one or more first API endpoints in the software application. The processor is further configured to obtain API traffic between a server running the software application and a client device, and analyze the API traffic to identify one or more second API endpoints in the software application. The processor is further configured to generate an API inventory by combining the identified one or more first API endpoints and one or more second API endpoints into a single data structure.

According to another aspect, there is provided a communication system, comprising a management system, a server, or a client device, the communication system comprising memory comprising programmed instructions stored thereon and a processor configured to be capable of executing the stored programmed instructions to obtain source code associated with a software application, and analyze the source code to identify one or more first API endpoints in the software application. The processor is further configured to obtain API traffic between the server running the software application and the client device and analyze the API traffic to identify one or more second API endpoints in the software application. The processor is further configured to generate an API inventory by combining the one or more first API endpoints and the one or more second API endpoints into a single data structure.

These and other aspects of the present application may become more readily apparent from the following description of the embodiments.

BRIEF DESCRIPTION OF THE DRAWINGS

The foregoing and other aspects of the present disclosure are best understood from the following detailed description when read in connection with the accompanying drawings. For the purpose of illustrating this technology, specific examples are shown in the drawings, it being understood, however, that the examples of this technology are not limited to the specific instrumentalities disclosed. Included in the drawings are the following Figures:

FIG. 2 shows a flowchart of the operation of the API management system according to the first embodiment;

FIG. 9 shows a flowchart of the operation of the API management system according to the second embodiment.

DETAILED DESCRIPTION

Figure 1:
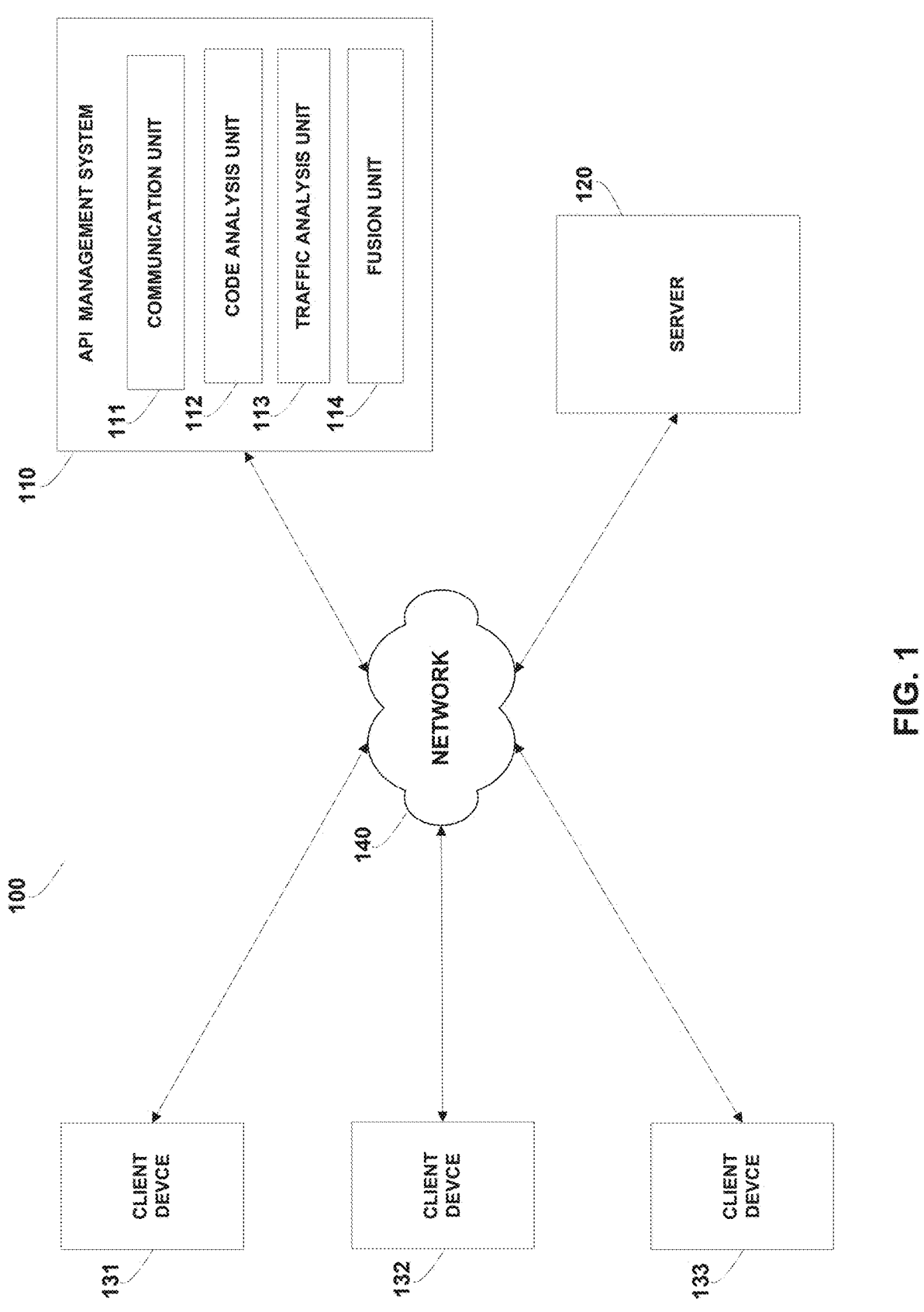
FIG. 1 shows a schematic illustration of an API management system within a communication system according to a first embodiment of the disclosure.

The present disclosure may be understood more readily by reference to the following detailed description of exemplary examples. Before the exemplary implementations and examples of the methods, devices, and systems according to the present disclosure are disclosed and described, it is to be understood that implementations are not limited to those described within this disclosure. Numerous modifications and variations therein will be apparent to those skilled in the art and remain within the scope of the disclosure. It is also to be understood that the terminology used herein is for describing specific implementations only and is not intended to be limiting. Some implementations of the disclosed technology will be described more fully hereinafter with reference to the accompanying drawings. This disclosed technology may, however, be embodied in many different forms and should not be construed as limited to the implementations set forth therein.

In the following description, numerous specific details are set forth. But it is to be understood that examples of the disclosed technology may be practiced without these specific details. In other instances, well-known components, structures, and techniques have not been shown in detail in order not to obscure an understanding of this description. References to "an implementation," "an example," "some examples," etc., indicate that the implementation(s) of the disclosed technology so described may include a particular feature, structure, or characteristic, but not every implementation necessarily includes the particular feature, structure, or characteristic. Further, repeated use of the phrase "in some examples" does not necessarily refer to the same implementation, although it may. Additionally, it is to be understood that particular features, structures, or characteristics that described in different examples, implementations or the like, may be further combined in various ways and being implemented in one or more implementations.

To aid this discussion, a number of definitions of terms used in this specification are provided.

An API is a set of rules and protocols that allows different software applications to communicate with each other by defining the way requests and responses should be formatted.

API documentation is written material that provides information about the functionality, usage, and expected behavior of an API, including details about one or more of endpoints, parameters, data types, and error handling.

Source code is human-readable instructions, written in a programming language, that define the functionality of a software program or application.

API traffic is the flow of requests and/or responses between clients and servers that utilize an API during operation of a software application or system.

An API endpoint is a specific point or location within an API where a client can send a request and receive a response, typically represented by a unique combination of an HTTP method (e.g., GET, POST, PUT, DELETE) and a URL path.

A hierarchical data structure is a data organization method that arranges data in a tree-like structure, consisting of nodes connected by edges, where each node can have one parent and one or more children.

Query parameters are key-value pairs appended to a URL in an API request that provide additional information or filtering options for the requested data.

Body parameters are key-value pairs included in the body of an API request, typically used for submitting data to be processed or stored by the API.

A node is an individual element within a hierarchical data structure, representing a specific level or segment of an API path.

A leaf node is a node in a hierarchical data structure that does not have any children, representing an endpoint of a branch in a tree.

An API inventory is a record of API endpoints and their associated metadata within a software application or system.

Technical solutions in the embodiments of the present disclosure will be described below with reference to the accompanying drawings.

Embodiments of the invention relate generally to API security, and more specifically, to a system and method for generating and maintaining an API inventory using a fusion unit that combines API documentation from source code and analysis of live API traffic, and corresponding non-transitory computer readable medium thereof.

FIG. 1 shows an API management system 110 within a communication system 100 according to a first embodiment. The communication system 100 comprises the API management system 110, a server 120, first to third client devices 131 to 133 and a network 140.

The first to third client devices 131-133 are capable of communicating over the network with the server 120. In addition, the API management system 110 is capable of communicating with the server 120 over the network 140. In this embodiment, the API management system 10 is accessible to all outgoing communication from the server 120.

Each of the first to third client devices 131 to 133 comprises at least a processor (not shown) and a communication unit (not shown). In this embodiment, the processor is configured to control the communication unit to request and receive data from the server 120 through an API at the server 120, in order to perform the communication with the server 120 discussed above. In this embodiment, each of the first to third client devices 131 to 133 is of the form of the computing system 300 discussed later with reference to FIG. 10, but this is just an example of an appropriate form of the first to third client devices 131-133.

The server 120 comprises at least a processor (not shown), a communication unit (not shown) and a memory (not shown). In this embodiment, the memory stores a software application configured by source code, capable of being executed by the processor. In addition, the memory stores data capable of being output via an API of the software application. In this embodiment, this data is video data. However, embodiments are not limited in this respect, and any other type of data could be output instead in other embodiments or variants of this embodiment (e.g., music, documents, personal data etc.).

The processor of the server 120 is configured to receive a request for data through the API via the communication unit from one or more of the first to third client devices 131 to 133, and to retrieve the requested data from the memory and send the requested data to the one or more of the first to third client devices 131 to 133 in order to perform the communication with the first to third client devices 131 to 133 discussed above.

The server 120 is configured to run a software application configured by source code. The software application includes at least one API which allows the first to third client devices 131 to 133 to send and/or request data from the server 120. This discussion will be focused on the first to third client devices 131 to 133 requesting data from the server 120, but is equally applicable to the first to third client devices 131 to 133 sending data to the server 120. Such communication (in either direction) may be referred to as "traffic" or "API traffic."

In this embodiment, the server 120 is of the form of the computing system 300 discussed later with reference to FIG. 10, but this is just an example of an appropriate form.

In this embodiment, the processor of the server 120 is further configured to control the communication unit to transmit the source code to the API management system 110 via the network 140. In addition, the processor of the server 120 is configured to control the communication unit to transmit a copy of all API traffic between the server 120 and the first to third client devices 131 to 133 to the API management system 110.

The API management system 110 comprises a communication unit 111, a code analysis unit 112, a traffic analysis unit 113, and a fusion unit 114.

The communication unit 111 is configured to perform communication with the server 120 over the network 140, in order to receive the source code of the software application stored on the server 120, as well as a copy of all API traffic between the server 120 and the first to third client devices 131 to 133 transmitted to the API management system 110.

The code analysis unit 112 is configured to analyze the source code to identify one or more first API endpoints in the software application. In this embodiment, the code analysis unit 112 comprises a source code parser and an endpoint extraction module for identifying and extracting one or more API endpoints from the source code.

As examples of source code analysis, in .NET, API endpoints are typically defined in Controller classes, with HTTP method attributes such as [HttpGet], [HttpPost], and route attributes such as [Route]. Analysis of Abstract Syntax Trees can also be used to identify classes that inherit from ControllerBase or ApiController, which typically indicate API controllers. In frameworks like Spring and JAX-RS, APIs are defined using annotations. For example, in Spring, @RestController and @RequestMapping (or @GetMapping, @PostMapping, etc.) are used to define APIs. In Python, API endpoints are typically defined as functions. In Flask, for example, the app.route( ) decorator is used to define routes. In Django, urlpatterns in urls.py files define the routes.

For each of these examples, analysis of an Abstract Syntax Tree (AST) can also be used for API enumeration and analysis. By traversing the AST and looking for definition nodes that correspond to API endpoints (such as functions decorated with certain annotations or attributes), it is possible to enumerate the APIs in a codebase.

However, it will be appreciated that these are only examples, and the principles of this source code analysis can also be applied to other frameworks. However, embodiments are not limited in this respect and any other suitable configuration for the code analysis unit 112 can be used in variants of this embodiment.

The traffic analysis unit 113 is configured to analyze the API traffic to identify one or more second API endpoints in the software application. In this embodiment, the traffic analysis unit 113 comprises a traffic inspection module and an endpoint extraction module for identifying and extracting AI endpoints. However, embodiments are not limited in this respect and any other suitable configuration for the traffic analysis unit 113 can be used in variants of this embodiment.

By analyzing API requests and responses, as well as optionally aggregating metadata about the traffic, it is possible to identify the API endpoints being used in said API requests and responses.

The fusion unit 114 is configured to generate an API inventory by combining the identified first API endpoints and second API endpoints into a single data structure. In this embodiment, the single data structure is a hierarchical data structure in which data is arranged in a tree-like structure, consisting of nodes connected by edges, where each node can have one parent and one or more children. This will be discussed further with reference to FIGS. 2 and 3.

The network 140 in this embodiment is the Internet. However, embodiments of the invention are not limited to this, and any suitable communications technology could be used instead. In addition, while a single network is shown in FIG. 1, embodiments of the invention are not limited to this. For example, in other embodiments, the first to third client devices 131 to 133 could communicate with the server 120 over a first network (e.g., the internet), while the API management system 110 communicates with the server 120 over a second network (e.g., a local area network).

In this specific embodiment, each device in FIG. 1 is shown as a single entity for ease of illustration. However, it will be appreciated that the functionality of each device may in other embodiments be split over more than one device. In other words, generally speaking, each device in FIG. 1 could be a single device or a distributed device.

The API management system 110 of this communication system 100 is able to generate and manage an inventory of API endpoints of a software application being operated in the server 120.

Figure 3:
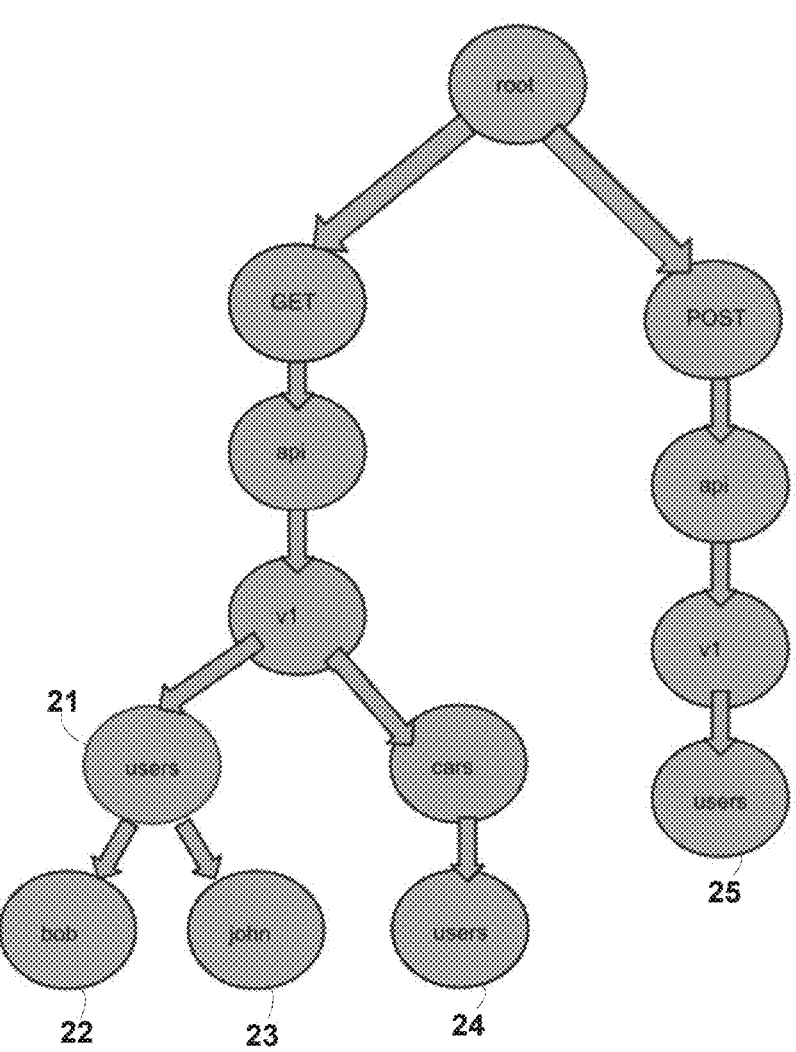
FIG. 3 shows an example hierarchical data structure.

FIG. 2 shows a flow chart of the operation of the API management system 110 according to the first embodiment. FIG. 3 shows an example hierarchical data structure. The operation of the API management system 110 will now be discussed with reference to the flow chart of FIG. 2 and the example of FIG. 3.

At step S1, the API management system 110 obtains source code associated with a software application. In this embodiment, the API management system 110 receives the source code from the server 120 over the network 140 via the communication unit 111. However, embodiments are not limited to this and any other suitable method obtaining the source code could be used instead.

At step S2, the code analysis unit 112 of the API management system 110 analyses the source code to identify one or more first API endpoints in the software application.

At step S3, the communication unit 111 of the API management system 110 obtains API traffic between the server 120 running the software application and one or more of the first to third client devices 131 to 133. The API traffic is the flow of requests and responses between the client devices 131 to 133 and the server 120 that utilize the API during an operation of the software application. In this embodiment, the API management system 110 receives the API traffic from the server 120 over the network 140 via the communication unit 111. In other words, the server 120 transmits a copy of all communication between it and any client devices to the API management system 110. However, embodiments are not limited to this and any other suitable method obtaining the API traffic could be used instead.

Hence, one or more requests and responses between the client devices 131 to 133 and the server 120 that utilize the API during the operation of the software application are generated, and the server 120 provides a copy of these requests and responses to the API management system 110.

At step S4, the traffic analysis unit 114 of the API management system 110 analyses the API traffic to identify one or more second API endpoints in the software application. Hence, the traffic analysis unit 114 analyses the obtained requests and responses between the client devices 131 to 133 and server 120 in order to identify any endpoints in the API that are revealed by these requests and responses.

At step S5, the fusion unit 114 of the API management unit 110 generates an API inventory by combining the identified first API endpoints and the identified second API endpoints into a single data structure. In this embodiment, the single data structure is a hierarchical data structure in which the API endpoints are arranged in a tree-like structure, consisting of nodes connected by edges, where each node has one parent and one or more children. The hierarchical data structure includes nodes representing different levels of API paths and their relationships, as well as a visual representation of endpoints. In this embodiment, the following algorithm is used in order to obtain this hierarchical data structure:

```
for each host in traffic inspection scan:
    create e in host endpoints:
        insert endpoint to host tree
    for each endpoints in code analysis scan:
        for each tree in host trees:
            if tree contains matches for the endpoint
                reduce matches with endpoint
```

```
    for each tree in host trees:
        traverse tree while merging endpoints metadata under
            same node
        print the merged endpoint
```

In other words, this involves breadth first search (BFS) traversal while merging the endpoints' data. In this embodiment, this involves requesting enrichments, such as class information, a fields and elements count, field ranges, possible responses, and authentication information.

Class information refers to data types or structures that the API uses or returns. For example, if the API returns JavaScript Object Notation (JSON) objects that represent users, the "User" class might have fields like "id," "username," and "email." The class information could also include methods that operate on these fields.

The fields and elements count refers to the number of fields in the data structures used by the API. For example, if the API returns a JSON object representing a user, the fields might be things like "id," "username," "email," etc. The count would be the total number of these fields, which helps to understand complexity.

Field ranges are the possible or typical values that a field can have. For example, an "id" field might be a number between 1 and 1000, a "username" might be a string of 1 to 20 alphanumeric characters, etc.

Possible responses are different types of responses that an API endpoint can return. For example, this could include different HTTP status codes, like 200 (200 OK) for a successful request or 404 (404 Not Found) for a not found error.

Authentication information is how an API handles authentication and authorization. For example, the API might require a certain header with an API key to be included in each request, or it might use OAuth or some other method. Understanding how to authenticate to an API allows a determination of how to use it.

While the above particular function and enrichments have been discussed here, embodiments are not limited in this respect, and in variants of this embodiments any other suitable function for organizing the identified endpoints into a hierarchical data structure can be used instead.

An example of these steps, and particularly of a hierarchical data structure in step S5 will now be discussed with reference to FIG. 3. In particular, FIG. 3 shows the resulting hierarchical data structure for this example.

In this example, at steps S1-S2, the API management system 110 obtains source code and analyses it to identify the following API endpoints:

GET https://api.com/v1/users/bob
POST https://api.com/v1/users

Furthermore, in this example, at steps S3-S4, the API managements system 110 obtains API traffic and analyses it to identify the following API endpoints:

GET https://api.com/v1/users/john
GET https://api.com/v1/cars/users

In this example, at step S5, the fusion unit 114 analyses and compares the four identified API endpoints to sort them into a single hierarchical data structure.

In particular, the fusion unit 114 determines that the uppermost node of the 'POST https://api.com/v1/users' endpoint is 'POST'. Since none of the other identified endpoints include this uppermost node, the path of this endpoint is not shared with any of the other identified endpoints and so the data structure must include this endpoint with its own unique path (see the right-hand side of FIG. 3).

In contrast, the fusion unit 114 determines that all of the other three identified endpoints share not just the uppermost node ('GET') but also the next two nodes ('api' and 'v1'). As a result of this, the fusion unit 114 determines that this portion of the path for all three of these identified endpoints can be shared (see the top left of FIG. 3).

When looking at the lower nodes, the fusion unit 114 determines that, after the node v1, the endpoint 'GET https://api.com/v1/cars/users' does not share its next node ('cars') with either of the other endpoints, since the next node for the other two endpoints is 'users', not 'cars'. As a result, the data structure must include the remainder of this endpoint with its own unique path (see the bottom-middle portion of FIG. 3).

For the other two identified endpoints ('GET https://api.com/v1/users/bob' and 'GET https://api.com/v1/users/john'), the fusion unit 114 determines that the next node ('users') is also shared and can be provided as a common node for the two identified endpoints within the single data structure. Next, the 'bob' and 'john' endpoints are provided separately (because they are different from each other).

Through this method, the four identified endpoints can be combined into an efficient and logical data structure. In particular, it can be seen that the endpoints bob 22, john 23, users 24, and users 25 are organized within this hierarchical data structure, with both bob 22 and john 23 sharing the node users 21. Hence, despite the fact that all of the identified endpoints include a 'users' node, through this method, the fusion unit 114 is able to determine that this does not necessarily mean that their paths can be fused, due to different higher nodes for these endpoints.

As can be seen, through this method of FIG. 2 (exemplified by the above example of FIG. 3), the API management system 110 is able to identify API endpoints for a given software application in different manners. The API management system 110 can combine the effective two resulting inventories or API endpoints identified in different manners into a single data structure. That is to say, the identified one or more first API endpoints and the identified one or more second API endpoints share the single data structure. Furthermore, through the implementation of a hierarchical data structure in the manner discussed with reference to FIG. 3, this data structure can be organized in an efficient and usable manner. However, embodiments are not limited to the use of a hierarchical structure, and other single data structure could be used instead in a variant of this embodiment.

Example of FIG. 3 has been discussed with reference to just four API endpoints, with two being identified in the source code and two being identified in the traffic analysis. However, it will be appreciated that this is only for ease of explanation. Practical implementations of embodiments of the disclosure may involve the identification of a much larger number of API endpoints, which in turn are fused into a single data structure. For example, in implementations in which numerous applications are running on the same server, hundreds of endpoints could be identified for that server.

Figure 4:
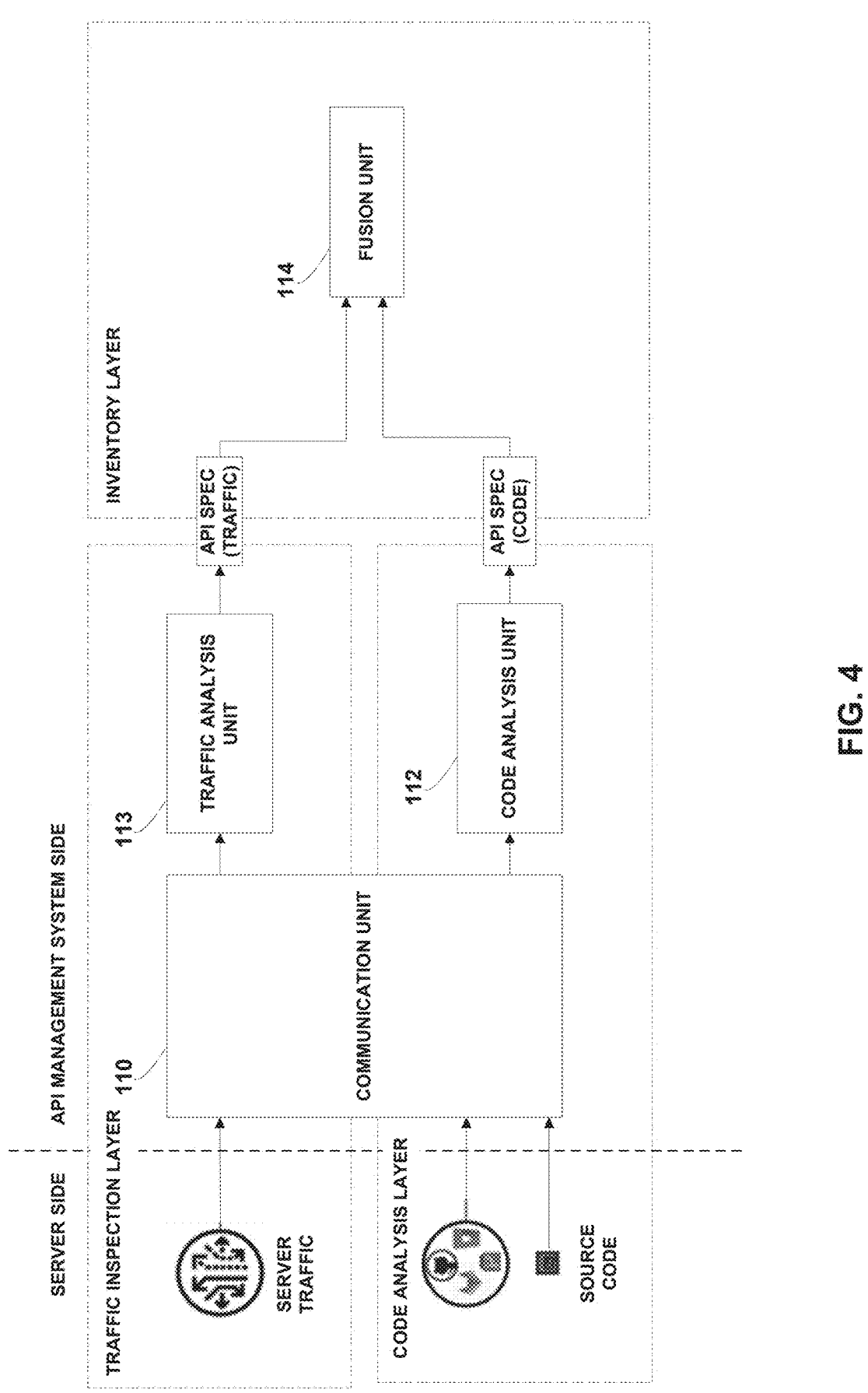
FIG. 4 shows an example architecture diagram for the API management system of the first embodiment.

FIG. 4 shows an example architecture diagram for the API management system 110. As can be seen in FIG. 4, there is a flow of data from the server side to the API management system side, including server traffic (i.e., the API traffic discussed above) and source code for a software application including the API (i.e., the source code discussed above).

On the API management system side, the data is received at the communication unit 110, and then fed to the traffic analysis unit 113 and code analysis unit 112 appropriately. In other words, the source code is fed to the code analysis unit 112 and the API traffic is fed to the traffic analysis unit 113.

Once the API endpoints are identified within the traffic inspection layer and code analysis layer by the traffic analysis unit 113 and code analysis unit 112 respectively, the API specification (i.e., the API endpoints) is fed to the fusion unit 114 in the inventory layer in order to 'fuse' the identified endpoints into a single data structure, as discussed above.

As discussed above, the API management communication system 100 is capable of generating an API inventory in the form of a single data structure, based on source code of a software application at the server 120 as well as API traffic between the server 120 and first to third client devices 131 to 133. In an example, the API management system 100 is capable of automatically generating this inventory. In other words, this embodiment provides a system and method for generating and maintaining an API inventory with a fusion unit 114 that combines API documentation from source code and analysis of live API traffic. The fusion unit 114 serves as the basis for a complete and automatically updated API inventory. Hence, this may provide a single, unified view of the server's API landscape, simplifying management tasks and reducing the time and effort required to monitor and maintain APIs. This can lead to increased efficiency and productivity for development and operation teams.

With the fusion unit 114 acting to combine API documentation from source code and analysis of live API traffic, the fusion unit 114 is able to generate a complete and up-to-date API inventory. This comprehensive inventory helps better understand and manage the API landscape of the server 120, which is essential for maintaining application performance, security, and compliance.

In other words, the fusion unit's ability to merge information from both the source code and API traffic results in more accurate and comprehensive API documentation (i.e. enhanced API documentation). This improved documentation can facilitate better communication among team members working on the software application, promote understanding of the APIs' functionality, and support more effective development and integration efforts. As a result, the actions of the API management system 110 including the fusion unit 114 can reduce the need for manual efforts to maintain and update the API inventory.

Furthermore, by maintaining a complete and accurate API inventory, the API management system 110 allows users/organizations associated with the server 120 to effectively identify and address potential security risks. The fusion unit 114 helps detect unauthorized or unexpected endpoints, allowing for prompt remediation of potential vulnerabilities and improving overall API security.

In this embodiment, the API traffic is live traffic (i.e., the server 120 sends the API traffic to the API management system 110 in real time). As such, the API management communication system 100 is continually analyzing the API traffic and updating the API inventory with any newly identified endpoints in real-time. Through the fusion unit 114 automatically updating the API inventory when changes are detected in either the source code or the live API traffic, this ensures that the inventory remains current, reducing the likelihood of outdated or missing information, which could lead to security vulnerabilities or performance issues. In this embodiment, the source code is also 'live' code. In other words, the server 120 sends the source code (or information on updates to the source code) to the API management system 110 in real time (i.e., the source code is sent each time it is updated, or at least the updated portion is sent). As such, the API management communication system 100 is continually analyzing the source code and updating the API inventory with any newly identified endpoints in real-time.

However, embodiments are not limited in this respect. For example, in a variant of this embodiment, the API traffic is instead sent to the API management system periodically (e.g., once an hour, once a day, or once a week). While such variants do not allow real-time updating of the API inventory in the same way as a live traffic, they do still allow the identification of API endpoints in time. For example, in a variant of this embodiment, instead of being sent in real time, the source code is only sent once or periodically. While such variants do not allow real-time updating of the API inventory, they can still be useful for identifying endpoints in the software application up to a particular point in time. In other words, while the use of live source code and real-time updating of the API inventory ensures the most useful and up to date API inventory, a useful API inventory can still be generated on the basis of one set of source code. The API management system is simply only able to generate an API inventory for a particular point in time rather than being able to continually update it after that point in time.

While steps S1-S5 have been discussed in a particular order with respect to FIG. 2, it will be appreciated that this is purely for ease of explanation and that the order can be changed. For example, steps S3-S4 could take place before, or in parallel to, steps S1-S2.

As mentioned above, in this embodiment, both the API traffic and source code are 'live', meaning that the API management system 110 receives them in real-time whenever there is an update (e.g., when new API traffic is sent/received or when the source code is updated). As a result, the steps of the flowchart of FIG. 2 are continually repeated as needed. For example, each time new source code is received, steps S1-S2 and S5 are performed to update the API inventory (i.e., to update the existing API inventory). Each time new API traffic is received, steps S3-S4 and S5 are performed to update the API inventory (i.e., to update the existing API inventory). In this respect, it will be appreciated that the relevant steps of the flowchart of FIG. 2 can be constantly repeated each time new source code and/or API traffic is received.

In a variant of this embodiment, the API management system 100 includes a display unit to display the generated API inventory. In another variant, the API management system 100 transmits the generated API inventory to the server 120 for display. In another variant, the API management system transmits the generated API inventory to another device (e.g., a user's PC) for display. As such, in any of these variants, the API inventory can be displayed to a user (e.g., developer of the software application) in order to allow the user to view the identified endpoints to determine whether any changes need to be made to the source code to close any of the independent endpoints (e.g., endpoints which were previously shadow or zombie endpoints that the user was not aware of).

In combination with the display of the API inventory, or separately from the display of the API inventory, in some variants of the embodiment, the API management system 100 can control the data flow output by the API endpoints included in the API inventory to identify unusual data activity and send a command to the server to halt or stop a transmission of the unusual data flow. For example, upon identifying a previously unknown API endpoint (e.g., a shadow or zombie endpoint), the API management system could send a command to the server to halt any data flow from that endpoint until the API management system 100 or server 120 receives user confirmation that the flow of data from this endpoint is allowed. In another example, the API management system 100 could monitor the flow of data from a particular identified endpoint and send a command to the server 120 to halt the data flow if the output data is of a predetermined type (e.g., personal information).

For example, by analyzing API requests and responses, as well as aggregating metadata about this traffic, it is possible to build a baseline (e.g., a reference) of what 'normal' traffic looks like for traffic to and from specific APIs and endpoints, as well as to identify deviations from this baseline and potential attacks on API endpoints. A predetermined threshold can be set and a deviation exceeding the predetermined threshold can indicate an existence of the unusual data discussed above.

In this embodiment, each of the first to third client devices 131 to 133 is a PC. However, embodiments of the disclosure are not limited to this. In other embodiments, the client devices could be any type of electronic device (e.g., smartphone, laptop, tablet etc.) capable of performing communication with a server 120.

While this embodiment has been discussed with an example of three client devices 131 to 133 being communicable with the server 120 in communication system 100, it will be appreciated that this is only for ease of explanation. It will be appreciated that in practical implementations of embodiments of the disclosure there may be many such devices. In addition, in other embodiments there may be fewer than three client devices (e.g., one client device) connected to the network 140.

Similarly, while this embodiment has been discussed with an example of a single server 120, it will be appreciated that this is only for ease of explanation. It will be appreciated that practical implementation of embodiments of the disclosure may involve a single API management system 110 generating an API inventory for multiple servers (or for multiple software applications running on a single server or on multiple servers). In other words, the API management system 110 and associated method is scalable, allowing the API management system 110 to handle a large number of APIs and endpoints. This scalable design ensures that the API management system 110 remains a valuable tool as the API landscape evolves.

Furthermore, in variants of the discussed embodiments, the fusion unit 114 can be tailored to specific needs and requirements of a particular user or organization, offering flexibility and adaptability in different environments and use cases.

While the server 120 and API management system 110 have been discussed as separate devices/systems in the embodiment, it will be appreciated that embodiments are not limited in this respect. In other words, in other embodiments, the functionality of the API management system 110 and server 120 can be incorporated into a single device. However, by providing the functionality of the API management system 110 in a separate standalone device/system, user convenience may be provided. In particular, the API management system 110 can be implemented in any existing system in which a server communicates with a client device, maybe with minimal adaptation (regarding transmitting source code and API traffic from the server to the API management system).

Furthermore, while the API management system 110 has been described as comprising a single communication unit 111 in discussed embodiment, embodiments are not limited in this respect. In other embodiments, separate communication units can be provided in the API management system for receiving the source code and traffic analysis. Furthermore, while this embodiment has been discussed in terms of the server 120 sending the source code and API traffic to the API management system 110, embodiments are not limited in this respect. For example, the source code associated with the software application of the server could be received from a different device (e.g., a user's laptop, other servers, etc.) in other embodiments.

While an embodiment has been discussed with reference to the API management system 110 comprising a plurality of separate processing-type units (code analysis unit 112, traffic analysis unit 113, fusion unit 114, etc.), it will be appreciated that this is purely for ease of explanation. In practical implementations of this embodiment, the API management system could be implemented in any computing system or network traffic management system that comprises a communication unit, a processor unit, and a memory (e.g., see FIG. 10 and its discussion).

In some embodiments, the generated API inventory can be in the form API documentation, which is then automatically used in API testing in lower environments or in production, for example through simulated attacks on the identified endpoints. Such simulated attacks can be performed by the API management system in some embodiments.

Figure 5:
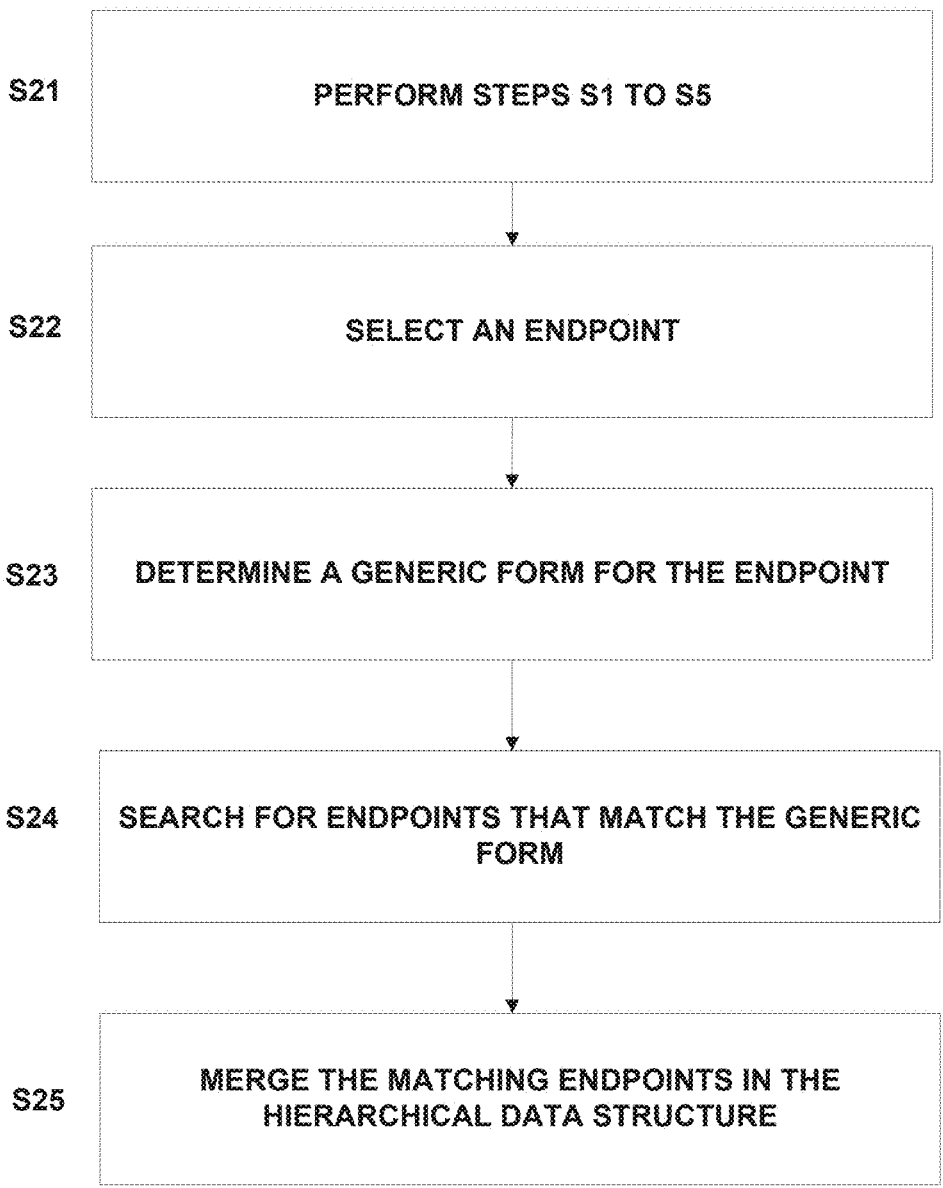
FIG. 5 shows a flowchart of the operation of the API management system according to a variant of the first embodiment.
Figure 6:
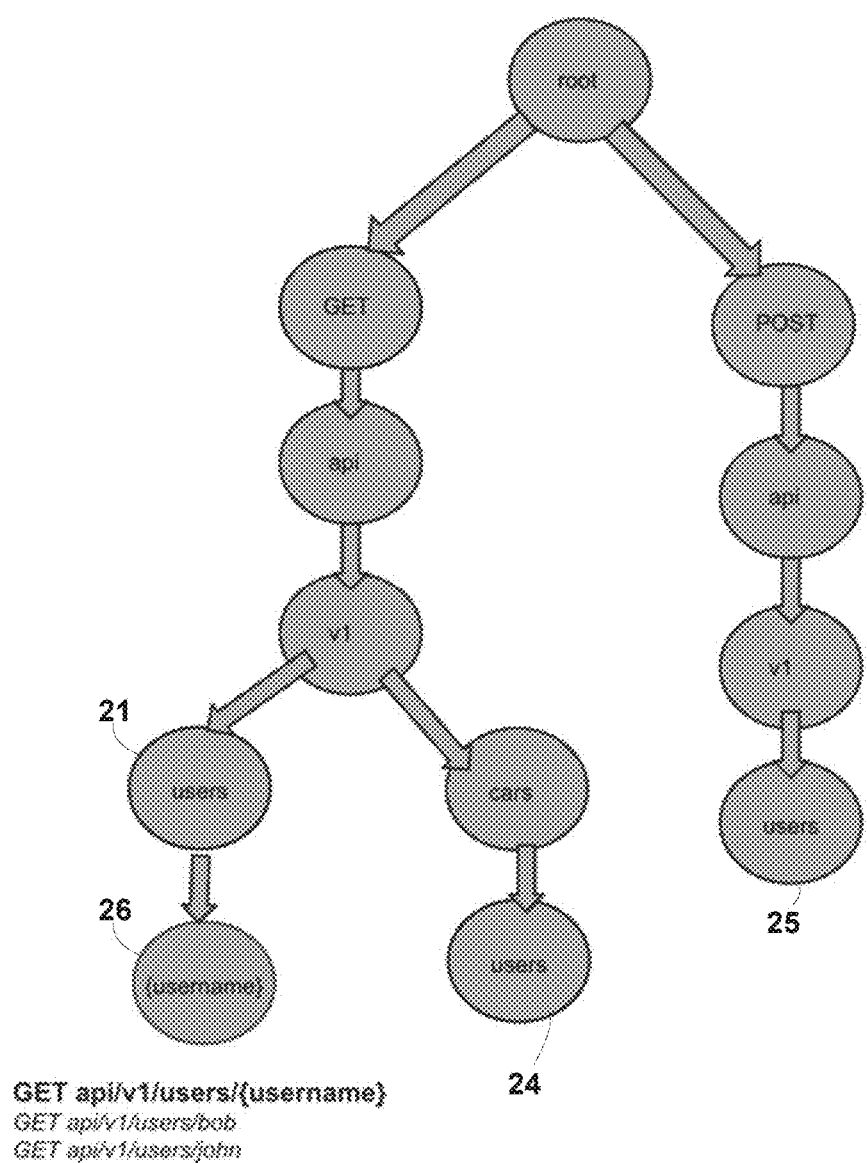
FIG. 6 shows another example hierarchical data structure.

FIG. 5 shows a flow chart of an operation of the API management system 110 according to a variant of the first embodiment discussed above. FIG. 6 shows an example resulting hierarchical data structure related to the hierarchical structure of FIG. 3. The operation of the API management system 110 will now be discussed with reference to the flow chart of FIG. 5 and the example of FIG. 6.

In this variant, in addition to organizing the identified endpoints into a hierarchical data structure, the fusion unit 114 of the API management system 110 is further configured to reduce the number of nodes included in the hierarchical data structure while ensuring that the hierarchical data structure still retains the acquired endpoint information. This will now be discussed in detail below.

The flow chart of FIG. 5 begins with step S21, in which the API management system 110 performs steps S1 to S5 of the flow chart of FIG. 2. Steps S1 to S5 have been discussed in detail with respect to FIG. 2 and a repeated discussion will be omitted here for brevity. These steps result in a hierarchical data structure (e.g., the hierarchical data structure of FIG. 3).

At step S22, the fusion unit 114 of the API management communication system 110 then selects a particular endpoint from the hierarchical data structure. There is no particular limitation as to which endpoint is selected or how it is selected. An example will be discussed in which the bob 22 endpoint of FIG. 3 is selected (i.e., GET https://api.com/v1/users/bob).

At step S23, the fusion unit 114 of the API management communication system 110 then determines a generic form for the endpoint. In an example in which the bob 22 endpoint of FIG. 3 (i.e., GET https://api.com/v1/users/bob) is selected, the fusion unit 114 could determine the generic form as GET users/{username}.

At step S24, the fusion unit 114 of the API management system 110 then searches for endpoint(s) that match this generic form. In this embodiment, the search is performed using a 'find_match' function and a 'compare_tree' function, as follows:

```
find_match(endpoint):
    current_node=root.get_child(endpoint.method)
    segments=split endpoint path to segments
    nodes=current_node.get_nodes_by_value(segments.
        pop( ))
    matches=empty list
```

```
    for each node in nodes:
        extend matches with compare_tree(node, segments,
            endpoint)
    return matches
compare_tree(node, segments, endpoint):
    if segments is empty:
        return matching endpoint from node.endpoints
    if node is not a leaf:
        segments=segments.pop( )
        matches=empty list
        for each child node.get_matching)children(seg-
            ment):
            extend matches with compare_tree(child, seg-
                ments, endpoint)
        return matches
    return empty list
```

From this, it can be seen that the 'find_match' function searches for nodes in the data structure that correspond to the selected API endpoint's path segments, while the 'compare_tree' function traverses the data structure to find matching endpoints.

Consider an example in which 'find_match' and a 'compare_tree' functions are applied to the above-discussed example of GET users/{username} with segments users, {username}. Within the 'find_match' function, both the users 21 node and the users 24 node are initially identified as matches (see line 3 of the 'find_match' function). However, when the users 24 node is then tested using the 'compare_tree' function, it is determined that it does not have any sub-nodes and therefore does not match with the looked-up path which requires another node that could correspond to '{username}'.

In contrast, when the users 21 node is tested using the 'compare_tree' function, it does have sub-nodes matching the looked-up path (both bob 22 and john 23). Hence, it is determined that both the bob 22 endpoint (i.e., GET https://api.com/v1/users/bob) and the john 23 endpoint (i.e., GET https://api.com/v1/users/john) are matches for GET users/{username}.

There are number of reasons why the users 25 node is not identified as a match, because it is not of the GET form and it does not have any sub-nodes that correspond to '{username}'.

At step S25, the fusion unit 114 then merges the matching endpoints in the hierarchical data structure. In this embodiment, the search is performed using a 'reduce_matches' function, as follows:

```
reduce_matches (matches, endpoint):
    segments=endpoints path segments
    for match in matches:
        if endpoint is not more generic than match:
            append endpoint to match.replaced
        else
            delete match from match.node.endpoints
            index=segments.length
            curr=match.node
            while curr.endpoints is empty and the curr is a
            leaf and index>0:
            index-=1
            delete curr from curr.parent.children
            curr=curr.parent
            for i=index; i<=segments.length; i++:
            curr=curr.get_child (segment [i–1])
            append match to endpoint.replaced
            append endpoint to curr.endpoints
```

It can be seen here that the 'reduce_matches' function acts to reduce the number of matches for a given endpoint by comparing the request entities of the identified matches. The request entities include query parameters and body parameters. If every parameter in request A is included in request B or vice versa, the requests are considered a match. The 'reduce_matches' function updates the hierarchical data structure accordingly.

When this 'reduce_matches' function is applied in the example discussed above, the matching bob 22 endpoint (i.e., GET https://api.com/v1/users/bob) and the matching john 23 endpoint (i.e., GET https://api.com/v1/users/john) are thereby reduced, with these two endpoint nodes being replaced by a single endpoint node in the form {username}.

In particular, see FIG. 6 in which the bob 22 node and the john 23 node are replaced by a single {username} 26 node which represents both of those two endpoints. In other words, the two matched bob and john nodes are removed in a 'backtrack' process where each matched node path is removed from the tree, and then the 'new' path-'users/{username}', is built into the tree replacing the found matches.

As can be seen from this example, this method of FIG. 5 acts to simplify the hierarchical data structure, merging nodes so as to reduce the number of nodes, while ensuring that the hierarchical data structure accurately represents all identified endpoints. This can be done despite the fact that the endpoints being determined as matching are not exactly the same (i.e., they share node(s) but the lowermost node (e.g., 'bob' and 'john' in FIG. 6) are different). In other words, a number of different endpoints can be determined as matches and merged within the hierarchical data structure.

While 'find_matches,' 'compare_tree,' and 'reduce_matches' functions discussed above are used as discussed above, embodiments are not limited to this. It will be appreciated that the same principles can be applied with different particular functions. As such, in other embodiments, any other suitable function for finding matching endpoints and then merging those endpoints can be used instead.

Figure 7:
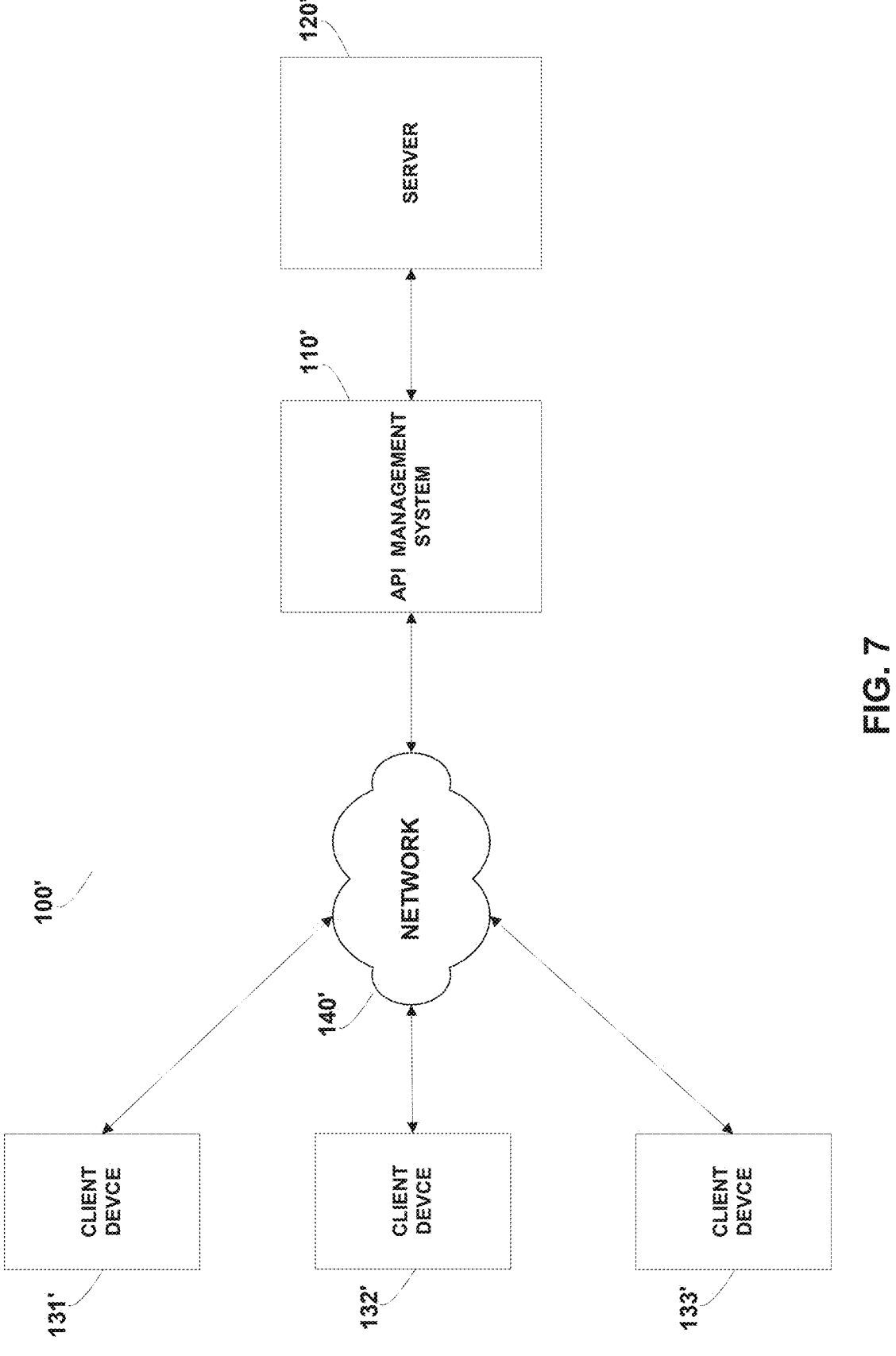
FIG. 7 shows a schematic illustration of an API management system within a communication system according to second embodiment of the disclosure.

FIG. 7 shows an API management system 110' within a communication system 100' according to a second embodiment. The communication system 100' comprises the API management system 110', a server 120', first to third client devices 131' to 133', and a network 140'. The components and functionality of the communication system 100' is largely the same as that of the communication system 100 of FIG. 1 and repeated discussions will be omitted here for brevity. Only differences are discussed.

In the communication system 100' of FIG. 7, unlike the communication system 100 of FIG. 1, the API management system 110' is positioned as an intermediary between the client devices 131' to 133' connected via the network 140' and the server 120'. Hence, rather than the server 120' communicating directly with the client devices 131' to 133' via the network 140', all of the API traffic (i.e., the data flow or requests and responses) goes via the API management system 110'.

In this embodiment, the API management system 110' receives the source code from the server 120' and receives the API traffic (since all API traffic goes via the API management system 110' anyway) in order to generate the API inventory. As such, the API inventory is generated in the same way as discussed above with respect to the communication system 100 of FIG. 1.

Furthermore, in this embodiment, the API management communication system 100' is then arranged to control the flow of data output by the API endpoints included in the API inventory to identify unusual data activity and halt the flow of unusual data. For example, upon identifying a previously unknown API endpoint (e.g., a shadow or zombie endpoint), the API management communication system 100' could halt the flow of any data from that endpoint until the API management system 110' receives user confirmation that the flow of data from this endpoint is allowed. In another example, the API management communication system 100' could monitor the flow of data from a particular identified endpoint and halt the flow if the output data is of a predetermined type (e.g., personal information).

While the API management communication system 100' can also be used to flag or halt suspicious data activity (e.g., by sending a message to the server 120' via the network 140' to halt the flow of data), the API management system 110' has an advantage that, by acting as an intermediary between the server 120' and 131' to 133', the API management system 110' can itself halt the flow of data (e.g., by discard, stop or not outputting data) received from the server 120' to the client devices 131' to 133'.

While the above embodiments have been discussed with reference to an API management system that includes only two API endpoint identification units (i.e., the code analysis unit 112 and traffic analysis unit 113), embodiments are not limited to this number. An example embodiment will now be described with an API management system includes three API endpoint identification units, with a fusion unit that generates/updates an API inventory by combining identified endpoints from all three endpoints identification units.

Figure 8:
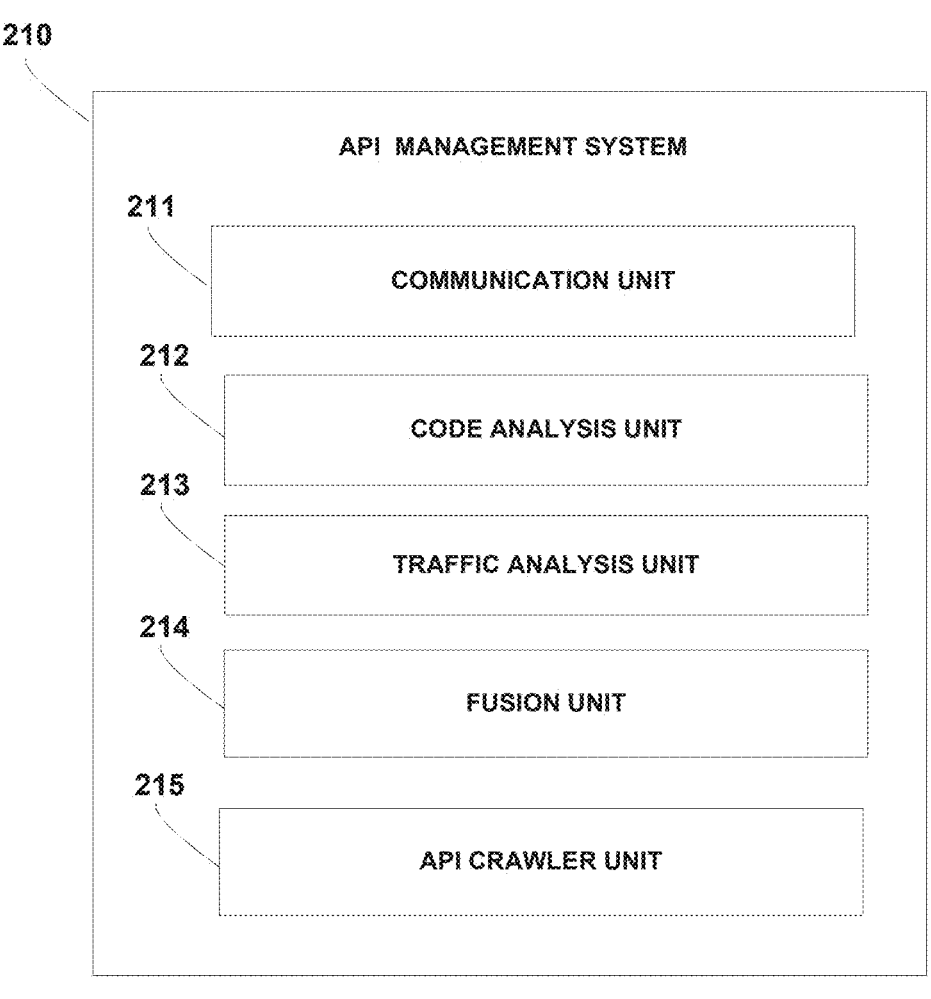
FIG. 8 shows a schematic illustration of an API management system according to a third embodiment of the disclosure.

FIG. 8 shows a schematic illustration of an API management system 210 according to a third embodiment of the invention. The API management system 210 is configured to within a communication or network traffic management system including a server and one or more client devices. In this embodiment, the API management system 210 is configured to replace the API management system 110 of FIG. 1.

The API management system 210 is substantially the same as the API management system 110 as shown in FIG. 1, except for the addition of an API crawler unit 215. In particular, the API management system 210 comprises a communication unit 211, a code analysis unit 212, a traffic analysis unit 213, a fusion unit 214, and an API crawler unit 215. The communication unit 211, code analysis unit 212, traffic analysis unit 213, and fusion unit 214 are substantially the same as the communication unit 111, code analysis unit 112, traffic analysis unit 113, and fusion unit 114 of FIG. 1, and repeated discussions thereof will be omitted. In other words, only differences will be discussed.

The API crawler unit 215 is configured to execute a headless browser to crawl server for information about or associated with client-side code and JavaScript. Then the API crawler unit 215 analyzes the crawled information associated with the client-side code and JavaScript to identify one or more third API endpoints in the software application. In this embodiment, the API crawler unit 215 executes a headless browser, scanning domains and subdomains of the server, and further enumerates client-side JavaScript for additional APIs and API endpoints.

In this embodiment, the headless browser is based on the "Beautiful Soup" Python Library. The headless browser is configured to find and track network requests that are made by client-side JavaScript, thereby enabling the discovery of APIs and endpoints that a web application uses.

In this embodiment, the API crawler unit 215 uses a 'Requests-HTML' tool to load a page, process all the JavaScript into HTML, and then uses Beautiful Soup to find and print the information regarding or associated with APIs (i.e., the API endpoints). Specifically, the following algorithm is used:

```
from bs4 import BeautifulSoup
from requests_html import HTMLSession
def find_endpoints(url):
    session=HTMLSession( )
    response=session.get(url)
    #Run JavaScript code on webpage
    response.html.render( )
    soup=BeautifulSoup(response.html.html,    'html-
        .parser')
    for script in soup.find_all('script'):
        if 'api' in script.text:
            print(script.text)
find_endpoints('https://www.example.com')
```

However, it will be appreciated that embodiments are not limited to this particular example. For example, while this example uses 'Requests-HTML', other embodiments could implement an algorithm that makes use of Selenium for this purpose instead.

More generally, it will be appreciated that embodiments are not limited to any particular method of executing a headless browser to crawl server for information associated with client-side code and JavaScript, and then analyze the information associated with client-side code and JavaScript to identify one or more third API endpoints in the software application. For example, there are various tools available that can be used for this purpose (e.g., Selenium, Pypetteer, HTML-Requests, etc.).

The fusion unit 214 is configured to generate an API inventory by combining the identified first API endpoints, second API endpoints, and third API endpoints into a single data structure. In other words, compared to the fusion unit 114 of the first embodiment, the fusion unit 214 of the third embodiment also incorporates the identified third API endpoints into the single data structure. The fusion unit 214 combines these endpoints into the single data structure in the same way as discussed above, and a repeated discussion thereof will be omitted here.

In this specific embodiment, each device or unit in FIG. 8 is shown as a single entity for ease of illustration. However, it will be appreciated that the functionality of each device or unit may in other embodiments be split into more than one devices or units. In other words, generally speaking, each unit in FIG. 8 could be a single unit or a distributed unit. The API management system 210 can generate and manage an inventory of API endpoints of a software application being operated in a server through the identification of API endpoint using the code analysis unit 212, traffic analysis unit 213, and fusion unit 214.

FIG. 9 shows a flow chart of the operation of the API management system 210 according to another embodiment.

At step S31, the API management system 210 obtains source code associated with a software application.

At step S32, the code analysis unit 212 of the API management system 210 analyses the source code to identify one or more first API endpoints in the software application.

At step S33, the communication unit 211 of the API management system 210 obtains API traffic between the server running the software application and one or more client devices.

At step S34, the traffic analysis unit 214 of the API management system 210 analyses the API traffic to identify one or more second API endpoints in the software application.

Steps S31 to S34 are performed in substantially the same manner as steps S1 to S4 of FIG. 2 and a repeated discussion thereof will be omitted here for brevity.

At step S35, the API crawler unit 215 executes a headless browser to crawl the server for information about client-side code and JavaScript. Then at step S36, the API crawler unit 215 analyses the information about client-side code and JavaScript to identify one or more third API endpoints in the software application.

As discussed above, in this embodiment, these steps involve the API crawler unit 215 using a 'Requests-HTML' tool to load a page, process all the JavaScript into HTML, and then use the Beautiful Soup tool to find and print the information regarding API endpoints (which are the identified "third API endpoints").

At step S37, the fusion unit 214 of the API management unit 210 generates an API inventory by combining the identified first API endpoints, the identified second API endpoints, and the identified third API endpoints into a single data structure. Steps S37 is performed in substantially the same way as step S5 of FIG. 2 except that the fusion unit 214 also incorporates the identified third API endpoints into the single data structure. The fusion unit 214 combines these endpoints into the single data structure in the same way as discussed above, and a repeated discussion thereof will be omitted here.

Through the inclusion of the API crawler 215 in this third embodiment, the API management system 210 is able to identify even more API endpoints in the software application than the API management system 110 of FIG. 1, while continuing to ensure that all identified endpoints can be combined in an efficient manner into a single data structure (e.g., a hierarchical data structure), further ensuring the awareness and security of APIs in the software application.

It will be appreciated that all implementation details, adaptations and variants discussed above with respect to aforementioned embodiments are also applicable to the embodiment discussed in conjunction with FIG. 9. Repeated discussions thereof will be omitted here for brevity. As an example, the method of FIG. 5 is equally applicable to this embodiment (where step S21 of FIG. 5 would involve the performance of steps S31 to S37 of FIG. 9 rather than step S1 to S5 of FIG. 2).

Simply speaking, anywhere in this specification that an API management system (e.g. the API management system 110 or API management system 110') has been discussed, said API management system can be replaced with the API management system 210.

Various examples have been described in conjunction with a software application herein. It is to be understood that to implement the technology introduced in this disclosure, there is no limitation to the number of software applications to be analyzed and therefore generating an API inventory for. Similarly, a claimed software application may be a portion or a component of another software application. A plurality of software applications or portions of software applications may be analyzed with the operations described herein parallelly, sequentially, or simultaneously as appropriate. Then the identified API endpoints of different portions of a software application or different software applications may be combined into the same or different data structures as needed.

Figure 10:
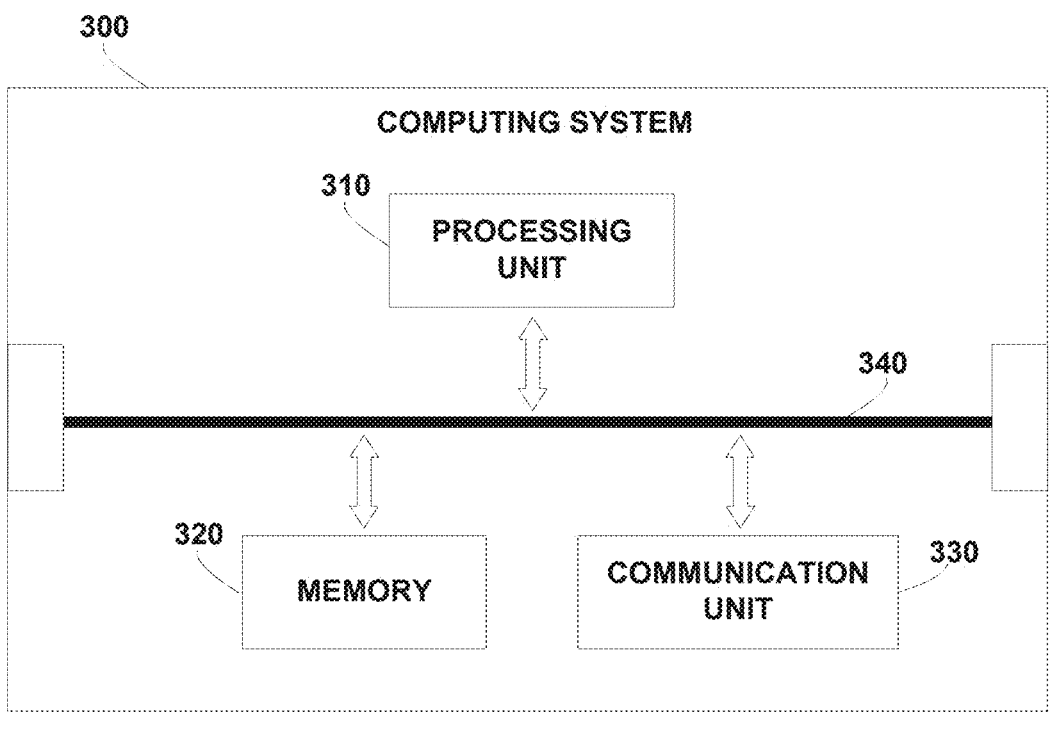
FIG. 10 shows a schematic illustration of a computing system according to an embodiment.

FIG. 10 shows a schematic illustration of a computing system 300 according to an embodiment. Specifically, FIG. 10 shows a schematic illustration of a computing system 300 configured to perform any of the methods discussed herein. Such detailed descriptions thereof are omitted here for brevity.

As shown in FIG. 10, the computing system 300 comprises a processing unit or a processor 310, a memory 320, and a communication unit 330. The processing unit 310, the memory 320 and the communication unit 330 may be connected via a bus system 340. The memory 320 is configured to store programs, instructions or codes. The processing unit 310 is configured to execute the programs, the instructions or the codes stored in the memory 320, so as to complete the operations of various units or steps discussed herein. For example, steps and operations discussed herein (e.g., obtaining the source code and obtaining the API traffic) can be performed or implemented by the processor 310 via the communication unit 330. The communication unit 330 may be a transceiver or other appropriate interface to fulfil related operations discussed herein. The communication unit 330 may also comprise a user interface that may include human-to-machine interface devices and/or graphical user interfaces (GUI). The processor 310 may include one or more central processing units (CPU) or general-purpose processors with one or more processing cores, for example, although other types of processor(s) can also be used.

Hence, in those embodiments, the memory 320 is configured to store a computer program capable of being run in the processing unit 310, and the processing unit 310 is configured to run the computer program to perform steps and/or operations in any of the methods discussed herein.

The memory 320 may store programmed non-transitory computer-readable instructions for one or more aspects of the technology as described and illustrated herein, although some or all of the programmed instructions could be stored elsewhere. A variety of different types of memory storage devices, such as random access memory (RAM), read only memory (ROM), Hard Disk Drive (HDD), solid state drives, flash memory, Erasable Programmable Read Only Memory (EPROM), or other computer readable medium such as magnetic or optical disc (e.g., Compact Disc Read Only Memory (CD-ROM)) which is read from and written to by a magnetic, optical, or other machine-readable medium that is coupled to the processor 310, may be used as the memory 320. Accordingly, the memory 320 may store application(s) that can include computer executable instructions that, when executed by the computing system 300, cause the computing system 300 to perform actions or operations, such as to transmit, receive, or otherwise process messages, for example, and to perform other actions or operations described and illustrated below with reference to the drawings. An application may be implemented as a unit, module, component, instance, or engine of other applications and/or operating system extensions, plugins, or the like. The application(s) can be executed within or as virtual machine(s) or virtual server(s) that may be managed in a cloud-based computing environment, without being tied to one or more specific physical network devices.

The methods, units, devices, systems, processing, along with appropriate circuitry and logic described herein, may be implemented in many different ways and in many different combinations of hardware, software, firmware, or combination thereof. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, a circuitry may store or access instructions for execution, or may implement its functionality in hardware alone. The instructions may be stored in a tangible storage medium (e.g., memory 320) that is other than a transitory signal. A product, such as a computer program product, may include a storage medium and instructions stored in or on the medium, and the instructions when executed by the circuitry in a device may cause the device to implement any of the processing described above or illustrated in the drawings.

The implementations discussed herein may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

It is to be understood that while the API management system has been generally discussed herein as comprising various units, for example, the code analysis unit 112, a traffic analysis unit 113, and a fusion unit 114, it will be appreciated that this is for ease of understanding. The methods disclosed herein can be performed by any computing device or system with the appropriate functionality, such as the computing system of FIG. 10.

The API management system may be implemented as a single device or as a distributed device. The API management system could be any suitable computing device (e.g., kubernetes pods, router, server, PC, tablet, laptop, etc.).

The server discussed herein may be any single or distributed device suitable for holding data and capable of sending that data over a network. For example, the server may act as a data repository. Any suitable network could be used.

The term "unit" (and other similar terms such as module, submodule, etc.) may refer to computing software, firmware, hardware, and/or various combinations thereof. At a minimum, however, units are not to be interpreted as software that is not implemented on hardware, firmware, or recorded on a non-transitory processor readable recordable storage medium. Indeed, "unit" is to be interpreted to include at least some physical, non-transitory hardware such as a part of a processor, circuitry, or computer. Two different units may share the same physical hardware (e.g., two different units can use the same processor and network interface). The units described herein can be combined, integrated, separated, and/or duplicated to support various applications. Also, a function described herein as being performed at a particular unit can be performed at one or more other units and/or by one or more other devices instead of or in addition to the function performed at the particular unit. Further, the units can be implemented across multiple devices and/or other components local or remote to one another. Additionally, the units can be moved from one device and added to another device, and/or can be included in both devices. The units can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The units can also be implemented in hardware using processors or circuitry on the same or different integrated circuit.

It will be appreciated that the functionality of each of the components discussed can be combined in a number of ways other than those discussed in the foregoing description. For example, in some embodiments, the functionality of more than one of the discussed devices or systems can be incorporated into a single device. In other embodiments, the functionality of at least one of the devices (or components of devices) discussed can be split into a plurality of separate (or distributed) devices (or a plurality of separate components within the device or system). Hence, any "device" discussed herein can be implemented as a system and any "system" discussed herein can be implemented as a device.

Embodiments of the invention can also provide a computer-readable medium having computer-executable instructions to cause one or more processors of a computing device or system to carry out the method of any of the embodiments of the invention.

Examples of computer-readable media include both volatile and non-volatile media, removable and non-removable media, and include, but are not limited to: solid state memories; removable disks; hard disk drives; magnetic media; and optical disks. In general, the computer-readable media include any type of medium suitable for storing, encoding, or carrying a series of instructions executable by one or more computers to perform any one or more of the processes and features described herein.

Conditional language such as "may", is generally used to indicate that features/steps are used in a particular embodiment, but that alternative embodiments may include alternative features, or omit such features altogether.

Furthermore, the method steps are not limited to the particular sequences described, and it will be appreciated that these can be combined in any other appropriate sequences. In some embodiments, this may result in some method steps being performed in parallel. In addition, in some embodiments, particular method steps may also be omitted altogether.

As discussed above, embodiments provide an API management system and method for generating and maintaining an API inventory by combining API documentation from source code and analysis of live API traffic. The API management system serves as the basis for a complete and automatically updated API inventory.

While certain embodiments have been discussed, it will be appreciated that these are used to exemplify the overall teaching of the present invention, and that various modifications can be made without departing from the scope of the invention. The scope of the disclosure should is to be construed in accordance with the appended claims and any equivalents thereof.

Many further variations and modifications will suggest themselves to those versed in the art upon making reference to the foregoing illustrative embodiments, which are given by way of example only, and which are not intended to limit the scope of the disclosure, that being determined by the appended claims.

What is claimed is:

1. A method for generating an Application Programming Interface (API) inventory in a system, the method implemented by the system comprising a management system, a client device, or a server, the method comprising:
   obtaining source code associated with a software application;
   analyzing the source code to identify one or more first API endpoints in the software application;
   obtaining API traffic between the server running the software application and the client device;
   analyzing the API traffic to identify one or more second API endpoints in the software application; and
   generating an API inventory by combining the one or more first API endpoints and the one or more second API endpoints into a single data structure.

2. The method of claim 1, further comprising:
   executing a headless browser to crawl the server for information associated with client-side code and scripting code; and
   analyzing the information associated with the client-side code and the scripting code to identify one or more third API endpoints in the software application,
   wherein generating the API inventory comprises combining the one or more first API endpoints, the one or more second API endpoints, and the one or more third API endpoints into the single data structure.

3. The method of claim 1, further comprising:
   monitoring data output by the API endpoints included in the API inventory to identify deviation data from the output data, wherein the deviation data deviates from a reference data by a predetermined threshold; and
   flagging the deviation data or stopping a transmission of the deviation data.

4. The method of claim 1, wherein the single data structure is a hierarchical data structure.

5. The method of claim 4, wherein the combining the one or more first API endpoints and the one or more second API endpoints into the single data structure comprises:
   comparing the identified API endpoints to identify matching API endpoints; and
   merging the matching API endpoints in the hierarchical data structure.

6. A system, comprising memory comprising programmed instructions stored in the memory and a processor configured to be capable of executing the programmed instructions stored in the memory to:
   obtain source code associated with a software application;
   analyze the source code to identify one or more first API endpoints in the software application;
   obtain API traffic between a server running the software application and a client device;
   analyze the API traffic to identify one or more second API endpoints in the software application; and
   generate an API inventory by combining the one or more first API endpoints and the one or more second API endpoints into a single data structure.

7. The system of claim 6, wherein the processor is further configured to:

execute a headless browser to crawl the server for information associated with client-side code and scripting code; and analyze the information associated with the client-side code and scripting code to identify one or more third API endpoints in the software application, wherein generate the API inventory comprises combining the one or more first API endpoints, the one or more second API endpoints, and the one or more third API endpoints into the single data structure.

8. The system of claim 6, wherein the processor is further configured to:

monitor data output by the API endpoints included in the API inventory to identify deviation data from the output data, wherein the deviation data deviates from a reference data by a predetermined threshold; and flag the deviation data or stop a transmission of the deviation data.

9. The system of claim 6, wherein the single data structure is a hierarchical data structure.

10. The system of claim 9, wherein the combine the one or more first API endpoints and the one or more second API endpoint into the single data structure comprises:

compare the identified API endpoints to identify matching API endpoints; and merge the matching API endpoints in the hierarchical data structure.

11. A non-transitory computer-readable medium having stored thereon instructions executable by a processor to:

obtain source code associated with a software application;

analyze the source code to identify one or more first API endpoints in the software application;

obtain API traffic between a server running the software application and a client device;

analyze the API traffic to identify one or more second API endpoints in the software application; and generate an API inventory by combining the one or more first API endpoints and the one or more second API endpoints into a single data structure.

12. The non-transitory computer-readable medium of claim 11, wherein the instructions are executable by the processor to:

execute a headless browser to crawl the server for information associated with client-side code and scripting code; and analyze the information associated with the client-side code and scripting code to identify one or more third API endpoints in the software application, wherein generate the API inventory comprises combining the one or more first API endpoints, the one or more second API endpoints, and the one or more third API endpoints into the single data structure.

13. The non-transitory computer-readable medium of claim 11, wherein the instructions are further executable by the processor to:

monitor data output by the API endpoints included in the API inventory to identify deviation data from the output data, wherein the deviation data deviates from a reference data by a predetermined threshold; and flag the deviation data or stop a transmission of the deviation data.

14. The non-transitory computer-readable medium of claim 11, wherein the single data structure is a hierarchical data structure.

15. The non-transitory computer-readable medium of claim 14, wherein the combine the one or more first API endpoints and the one or more second API endpoint into the single data structure comprises:

compare the identified API endpoints to identify matching API endpoints; and merge the matching API endpoints in the hierarchical data structure.

16. A communication system, comprising a management system, a server, or a client device, the communication system comprising memory comprising programmed instructions stored thereon and a processor configured to be capable of executing the stored programmed instructions to:

obtain source code associated with a software application;

analyze the source code to identify one or more first API endpoints in the software application;

obtain API traffic between the server running the software application and the client device;

analyze the API traffic to identify one or more second API endpoints in the software application; and generate an API inventory by combining the one or more first API endpoints and the one or more second API endpoints into a single data structure.

17. The communication system of claim 16, wherein the processor is further configured to:

execute a headless browser to crawl the server for information associated with client-side code and scripting code; and analyze the information associated with the client-side code and scripting code to identify one or more third API endpoints in the software application, wherein generate the API inventory comprises combining the one or more first API endpoints, the one or more second API endpoints, and the one or more third API endpoints into the single data structure.

18. The communication system of claim 16, wherein the processor is further configured to:

monitor data output by the API endpoints included in the API inventory to identify deviation data from the output data, wherein the deviation data deviates from a reference data by a predetermined threshold; and flag the deviation data or stop a transmission of the deviation data.

19. The communication system of claim 16, wherein the single data structure is a hierarchical data structure.

20. The communication system of claim 19, wherein the combine the one or more first API endpoints and the one or more second API endpoint into the single data structure comprises:

compare the identified API endpoints to identify matching API endpoints; and merge the matching API endpoints in the hierarchical data structure.

* * * * *